US011023495B2

(12) United States Patent
Modarresi et al.

(10) Patent No.: US 11,023,495 B2
(45) Date of Patent: Jun. 1, 2021

(54) AUTOMATICALLY GENERATING MEANINGFUL USER SEGMENTS

(71) Applicant: Adobe Inc., San Jose, CA (US)

(72) Inventors: Kourosh Modarresi, Los Altos, CA (US); Hongyuan Yuan, San Jose, CA (US); Charles Menguy, New York, NY (US)

(73) Assignee: ADOBE INC., San Jose, CA (US)

( * ) Notice: Subject to any disclaimer, the term of this patent is extended or adjusted under 35 U.S.C. 154(b) by 144 days.

(21) Appl. No.: 15/925,707

(22) Filed: Mar. 19, 2018

(65) Prior Publication Data

US 2019/0286739 A1    Sep. 19, 2019

(51) Int. Cl.
*G06F 7/00*       (2006.01)
*G06F 16/28*      (2019.01)
*H04L 29/08*      (2006.01)
*G06F 16/2458*    (2019.01)
*G06F 16/2457*    (2019.01)

(52) U.S. Cl.
CPC ........ *G06F 16/285* (2019.01); *G06F 16/2465* (2019.01); *G06F 16/24578* (2019.01); *H04L 67/22* (2013.01); *G06F 2216/03* (2013.01)

(58) Field of Classification Search
CPC .. G06F 16/285; G06F 16/287; G06F 16/9535; G06F 16/904; G06F 16/217; G06F 16/2219; G06F 16/951
See application file for complete search history.

(56) References Cited

U.S. PATENT DOCUMENTS

| | | | | |
|---|---|---|---|---|
| 8,655,695 B1* | 2/2014 | Qu | ............... | G06Q 30/0251 |
| | | | | 705/7.33 |
| 8,855,695 B2* | 10/2014 | Choi | ............... | H04W 36/00 |
| | | | | 455/515 |
| 9,454,726 B1* | 9/2016 | Yao | ............... | G06N 5/04 |
| 9,471,869 B2* | 10/2016 | Hall | ............... | G06N 3/088 |
| 9,495,414 B2* | 11/2016 | Hall | ............... | G06F 16/2425 |
| 9,860,148 B2* | 1/2018 | George | ............... | G06Q 10/08 |
| 9,904,932 B2* | 2/2018 | Fabrikant | ............... | G06F 16/29 |
| 9,912,483 B2* | 3/2018 | Carlson | ............... | H04L 9/3242 |
| 2012/0226559 A1* | 9/2012 | Baum | ............... | G06Q 30/02 |
| | | | | 705/14.66 |

(Continued)

OTHER PUBLICATIONS

Combined Search and Examination Report as received in United Kingdom Application GB1900133.8 dated Jun. 13, 2019.

(Continued)

*Primary Examiner* — Daniel A Kuddus
(74) *Attorney, Agent, or Firm* — Keller Jolley Preece

(57) ABSTRACT

Systems, methods, and non-transitory computer-readable media (systems) are disclosed for generating meaningful and insightful user segment reports based on a high dimensional data space. In particular, in one or more embodiments, the disclosed systems utilize a relaxed bi-clustering model to automatically identify user segments in a data space including datasets of features specific to individual users. In at least one embodiment, the disclosed systems identify and include users in automatically generated user segments even though those users are associated with some, but perhaps not all, of the features as other members in the automatically generated user segments.

20 Claims, 11 Drawing Sheets

(56) References Cited

U.S. PATENT DOCUMENTS

| | | | | |
|---|---|---|---|---|
| 2012/0226700 | A1* | 9/2012 | Chang | G06Q 30/0251 707/748 |
| 2013/0073859 | A1* | 3/2013 | Carlson | G06Q 20/325 713/176 |
| 2015/0240042 | A1* | 8/2015 | Nguyen | C08J 5/24 523/468 |
| 2016/0048577 | A1* | 2/2016 | Hall | G06F 16/2425 707/737 |
| 2016/0048756 | A1* | 2/2016 | Hall | G06F 16/2425 706/20 |
| 2016/0048885 | A1* | 2/2016 | Chang | G06Q 30/0251 705/14.66 |
| 2016/0123041 | A1* | 5/2016 | Chen | B60D 1/60 70/34 |
| 2016/0125041 | A1* | 5/2016 | Smith | G06F 16/9535 707/770 |
| 2016/0134934 | A1* | 5/2016 | Jared | G06Q 30/0203 725/14 |
| 2016/0140587 | A1* | 5/2016 | Wilson | G06Q 30/0204 705/7.33 |
| 2016/0189186 | A1* | 6/2016 | Fabrikant | H04W 4/025 705/7.34 |
| 2016/0328748 | A1* | 11/2016 | Koran | G06Q 30/0277 |
| 2017/0011111 | A1* | 1/2017 | Pallath | G06F 16/285 |
| 2017/0357988 | A1* | 12/2017 | Paulsen | G06F 3/0484 |
| 2018/0129744 | A1* | 5/2018 | George | H04L 67/22 |
| 2018/0240036 | A1* | 8/2018 | Boada | G06Q 30/02 |
| 2018/0260587 | A1* | 9/2018 | Peacock | G06F 9/4416 |

OTHER PUBLICATIONS

J.A. Hartigan, M.A.W., Algorithm AS 136: A K-Means Clustering Algorithm. Journal of the Royal Statistical Society. Series C (Applied Statistics), 1979. 28(1): p. 100-108.

Ward, J.H., Hierarchical Grouping to Optimize an Objective Function. Journal of the American Statistical Association, 1963. 58(301): p. 236-244.

Fisher, R.A., Frequency Distribution of the Values of the Correlation Coeffients in Samples From an Indefinitely Large Population. Biometrika, 1915. 10(4): p. 507-521.

Bennett, C.H., et al., Information distance. IEEE Transactions on Information Theory, 1998. 44(4): p. 1407-1423.

Hartigan, J.A., Direct Clustering of a Data Matrix. Journal of the American Statistical Association, 1972. 67(337): p. 123-129.

Cheng, Y. and G.M. Church, Biclustering of Expression Data, in Proceedings of the Eighth International Conference on Intelligent Systems for Molecular Biology. 2000, AAAI Press. p. 93-103.

Madeira, S.C. and A.L. Oliveira, Biclustering Algorithms for Biological Data Analysis: A Survey. IEEE/ACM Trans. Comput. Biol. Bioinformatics, 2004. 1(1): p. 24-45.

Oghabian A, K.S., Hautaniemi S, Czeizler E, Biclustering Methods: Biological Relevance and Application in Gene Expression Analysis. 2014.

Tanay, A., R. Sharan, and R. Shamir, Discovering statistically significant biclusters in gene expression data. Bioinformatics, 2002. 18 (suppl_1): p. S136-S144.

Dhillon, I.S., Co-clustering documents and words using bipartite spectral graph partitioning, in Proceedings of the seventh ACM SIGKDD international conference on Knowledge discovery and data mining. 2001, ACM: San Francisco, California. p. 269-274.

Prelić, A., et al., A systematic comparison and evaluation of biclustering methods for gene expression data. Bioinformatics, 2006. 22(9): p. 1122-1129.

Ben-Dor, A., et al., Discovering local structure in gene expression data: the order-preserving submatrix problem, in Proceedings of the sixth annual international conference on Computational biology. 2002, ACM: Washington, DC, USA. p. 49-57.

Bergmann, S., J. Ihmels, and N. Barkai, Iterative signature algorithm for the analysis of large-scale gene expression data. Physical Review E, 2003. 67(3): p. 031902.

T. M.Murali, S.K. Extracting Conserved Gene Expression Motifs from Gene Expression Data. In Proceedings of the Pacific Symposium on Biocomputing. 2003.

Examination Report as received in UK application GB1900133.8 dated Dec. 15, 2020.

* cited by examiner

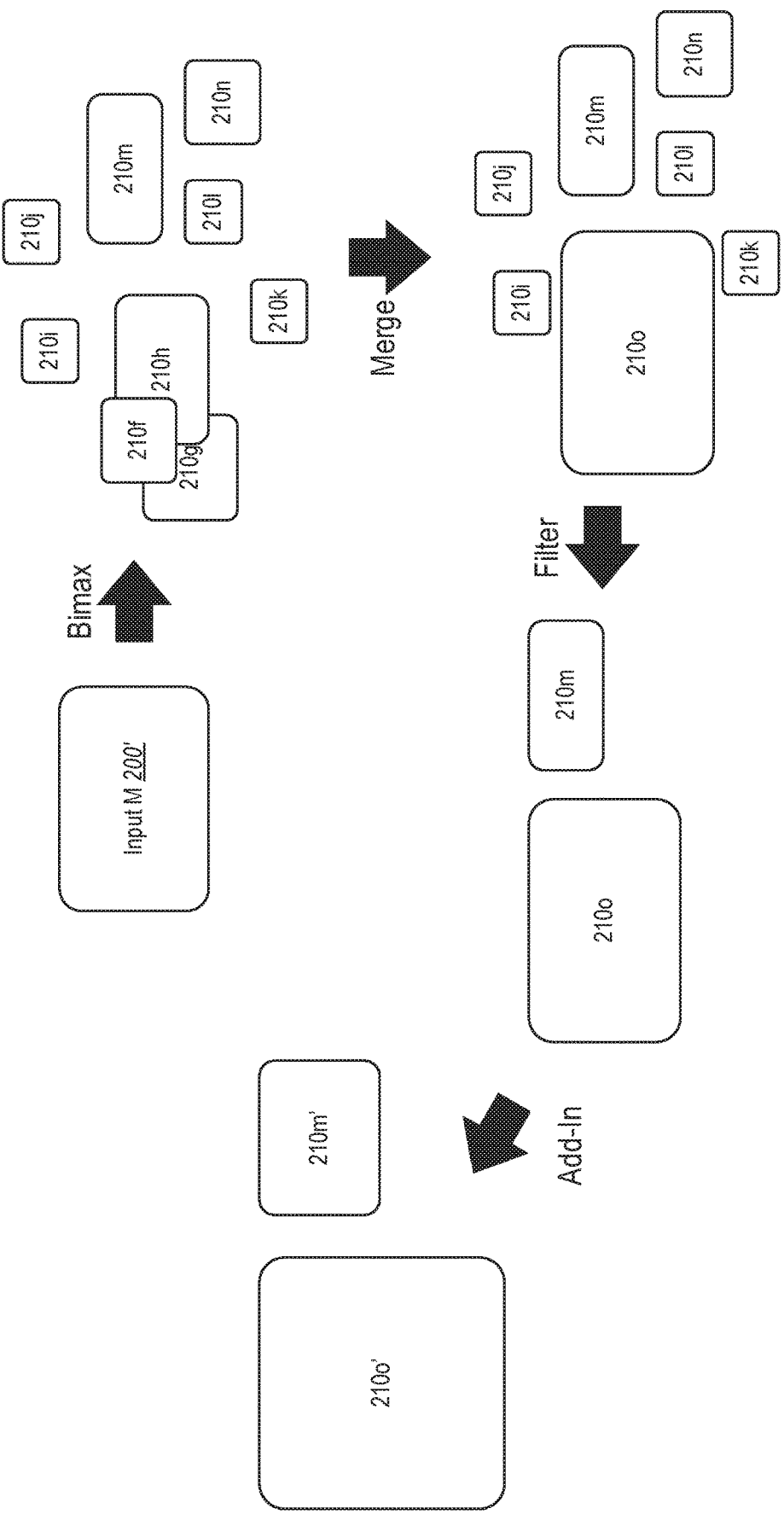

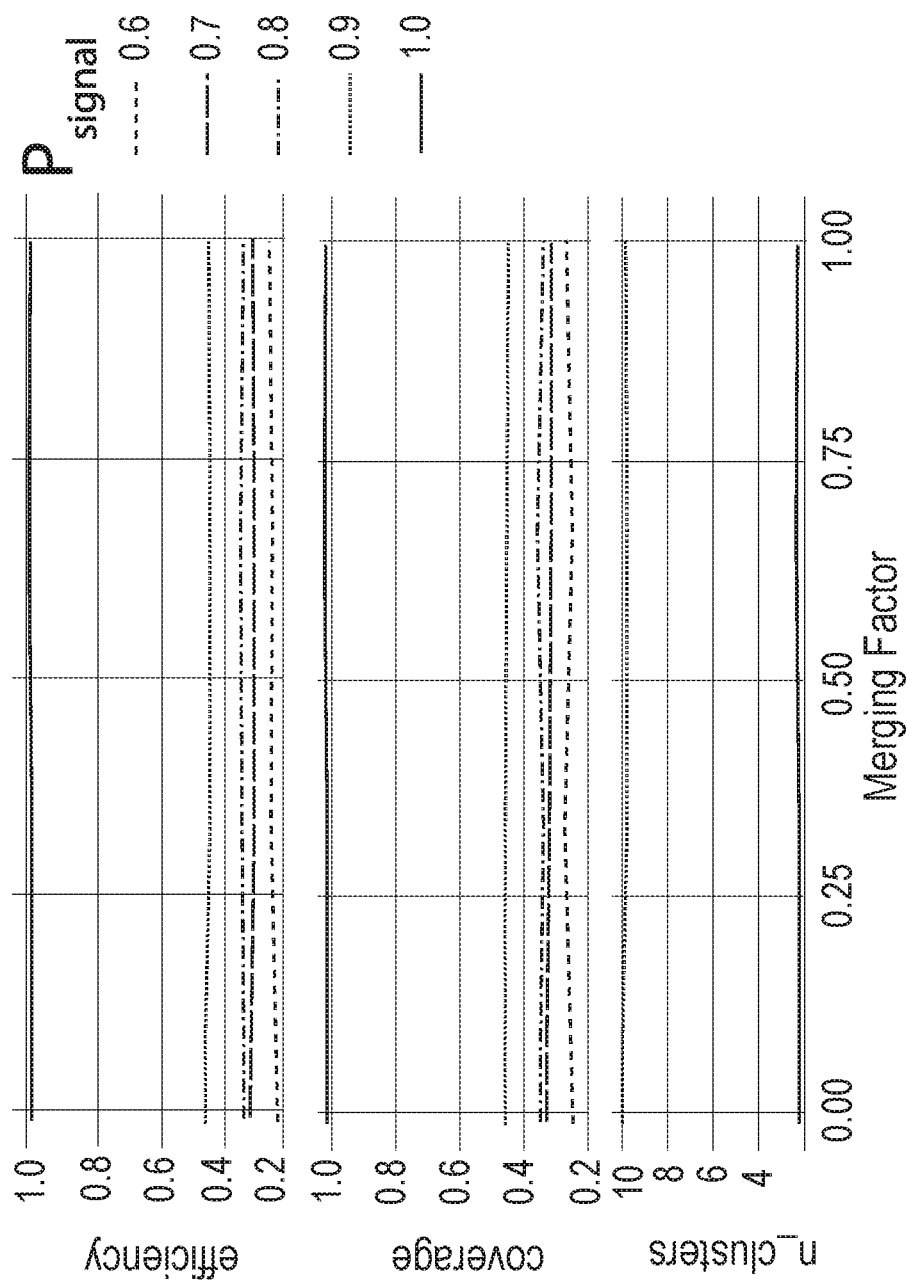

AUTOMATICALLY GENERATING MEANINGFUL USER SEGMENTS

BACKGROUND

Recent years have seen significant improvement in hardware and software platforms for performing analytics in connection with large collections of data. For example, conventional analytics systems perform a rule-based analysis of user data to identify clusters within large collections of data that represent users who share traits, characteristics, or features. Generally, conventional analytics systems then present these cluster-based user segments to analysts or managers for segment-based targeting of products, services, and advertisements.

Not only do users routinely access millions of websites or applications a day, but a single website, application, or Uniform Resource Locator may receive thousands to millions of visits or views a day. With such large quantities of network destinations and visits, web administrators and marketers often seek to gather information concerning specific segments of users who visit a website, application, or a collection of websites or applications. In some instances, a web administrator may seek to identify a specific segment of users who have certain characteristics or who have demonstrated a certain pattern of behavior.

Despite the utility of identifying information about specific segments, the amount of analytic data a system may collect for even a single website or application may be unwieldy or too difficult to manage or mine. The amount of data can be particularly problematic for websites or applications that receive thousands or millions of daily visitors or users. Conventional analytics engines often lack the ability to identify and organize captured data in highly specified categories. Even the conventional analytics engines that possess this ability, however, consume significant processing power to create specific segments that satisfy sophisticated query parameters. To identify specific segments for some high-volume websites or applications, some conventional analytics engines or methods may require individually analyzing billions of transactions to identify data representing segments defined by sophisticated query parameters. Without the processing power or time to individually analyze such a large quantity of transactions, some web administrators must manually program code to generate the segment. Such customized segmenting is often time consuming and does not allow the administrator to easily change or revise the segment.

Thus, conventional analytics systems are often inaccurate. For instance, conventional analytics systems can inaccurately identify clusters within a high dimensional space due to noise in the data. In particular, large amounts of data and noise can lead to un-insightful or uninterpretable segments.

Moreover, conventional analytics systems are typically inflexible. For example, convention analytics systems often utilize rigid clustering techniques where every binary entry of the cluster must be a one. Thus, such conventional analytics systems fail to include adjacent users who share many of the same cluster characteristics. As such, conventional analytics systems inflexibly produce user segment clusters that fail to give robust insight or meaning.

Accordingly, there are several disadvantages to current methods for data analytics.

BRIEF SUMMARY

This disclosure describes one or more embodiments that provide benefits and/or solve some or all of the foregoing (or other) problems with systems, computer-readable media, and methods that generate insightful and meaningful user segment reports utilizing a relaxed bi-clustering model that automatically identifies user segments in a high dimensional data space. The systems, computer-readable media, and methods identify and include users in automatically generated user segments even though those users are associated with some, but perhaps not all, of the features as other users in the automatically generated user segments. Ultimately, the systems, computer-readable media, and methods extend conventional analytics systems by providing an efficient, accurate, and robust user segment reports that identify meaningful and insightful user segments within high dimensional data spaces.

In particular, the systems, computer-readable media, and methods identify relaxed user segments and generate meaningful user segment reports. For example, in one or more embodiments, after identifying one or more user segment bi-clusters in the data space, the systems, computer-readable media, and methods merge the identified user segment bi-clusters to create a new group of user segments. Additionally, after merging user segment bi-clusters, the systems, computer-readable media, and methods filter smaller user segments out of the new group of user segments. Still further, after filtering the user segments, the systems, computer-readable media, and methods generate more meaningful and rich segments by adding certain users back into the remaining collection of user segment based on their similarity to the remaining user segments.

Additional features and advantages of one or more embodiments of the present disclosure will be set forth in the description which follows, and in part will be obvious from the description, or may be learned by practice of such example embodiments.

BRIEF DESCRIPTION OF THE DRAWINGS

The detailed description is described with reference to the accompanying drawings in which:

FIG. 3A illustrates an example overview of the steps enacted by the digital analytics system in generating meaningful and insightful user segments in accordance with one or more embodiments;

FIGS. 6A-6E illustrate output graphs showing the advantages of the digital analytics system over conventional analytics systems in accordance with one or more embodiments;

DETAILED DESCRIPTION

Figure 1:
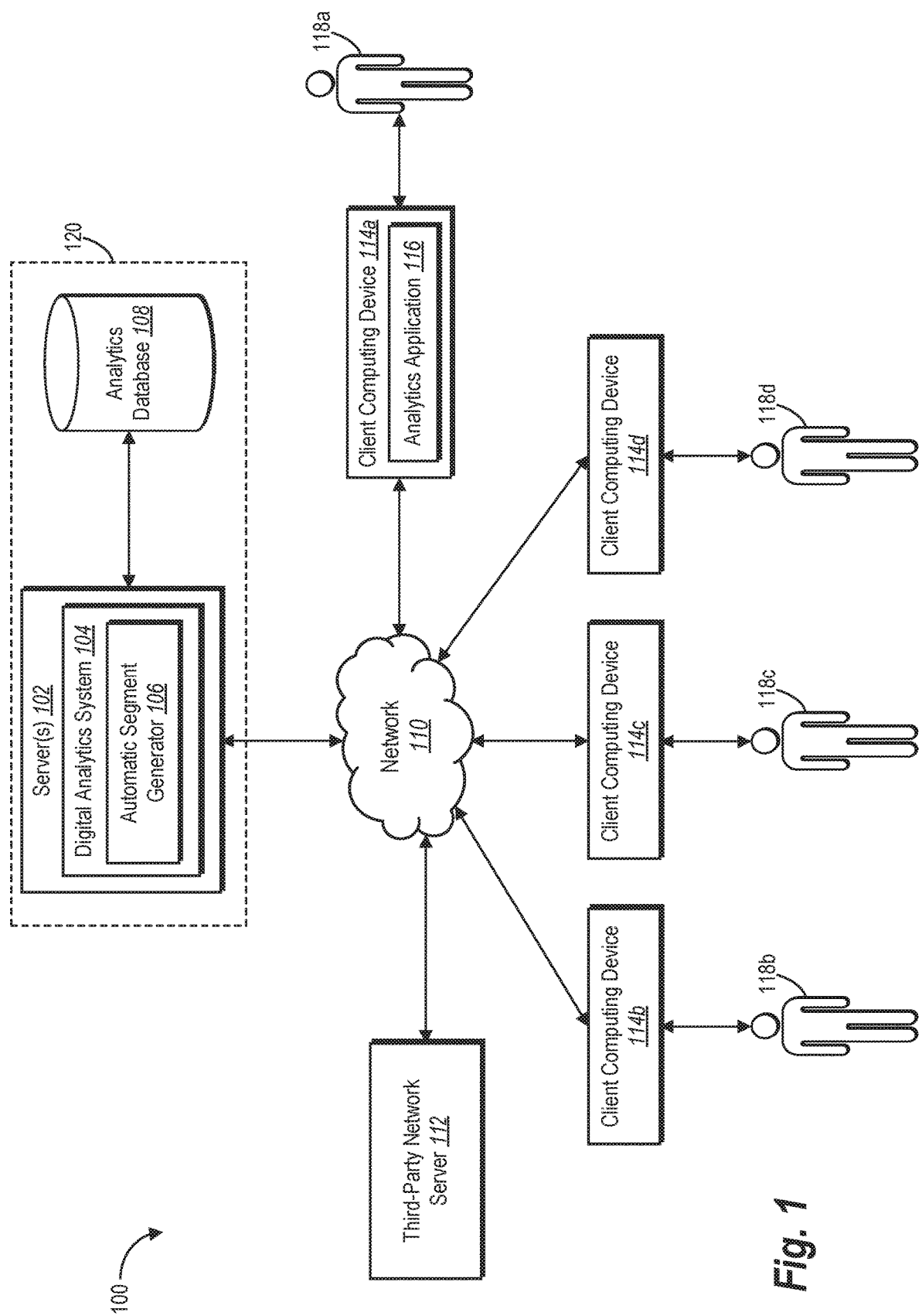
FIG. 1 illustrates an example environment in which the digital analytics system operates in accordance with one or more embodiments.

This disclosure describes one or more embodiments of a digital analytics system that generates meaningful and insightful user segment reports detailing user segments within a high dimension data space. More specifically, in some embodiments, the digital analytics system utilizes a relaxation of rigid segment creation algorithms to identify user segments and generate user segment reports that lend insight and meaning to a user segment analysis. In this way, the digital analytics system overcomes the limitations of conventional analytics systems to provide an accurate, efficient, and flexible user segmentation solution even when dealing with large and noisy data sets.

In particular, in one or more embodiments, the digital analytics system uses a rigid conventional technique to identify a first set of user segments. After identifying the initial user segments, the digital analytics system merge similar rigid user segments to create relaxed user segments. Additionally, after merging rigid user segments, the digital analytics system filters smaller user segments out of the relaxed user segments. Still further, after filtering the relaxed user segments, the digital analytics system generates meaningful and rich segments by adding certain users back into the remaining collection of user segments based on a similarity of the users to the remaining user segments.

As an illustrative example, the digital analytics system first generates one or more user datasets that make up a high dimensional data space. For example, the digital analytics system can generate user datasets based on raw collection data maintained by a third-party network server. In one or more embodiments, each user dataset in the data space represents features of a user. For example, in a user dataset, the digital analytics system assigns a value of one to each feature that corresponds to that user. If a feature does not correspond to a the user, the digital analytics system represents the entry in the dataset for that feature as a zero. Thus, the digital analytics system represents each user with a correlated dataset in the data space as a collection of feature entries that are either one or zero.

In one or more embodiments, after generating user datasets to make a data space, the digital analytics system utilizes a rigid segmentation algorithm to identify one or more rigid user segments from the data space. In one or more embodiments, the digital analytics system utilizes a rigid segmentation algorithm that relies on "closeness" within the data space in order to identify rigid user segments that consist of users sharing the same set of features.

Once the digital analytics system generates the rigid user segments, the digital analytics system generates relaxed user segments and generate meaningful user segment reports. For example, in one or more embodiments, after generating the rigid user segments, the digital analytics system merges the rigid user segments to a first set of relaxed user segments. In at least one embodiment, the digital analytics system merges rigid user segments in order to identify user segments that are not repetitive and rather illustrate more fully the features shared by users across a data space without requiring that the users in the relaxed user segments share the exact same set of features. For instance, in at least one embodiment, the digital analytics system merges rigid user segments that overlap by more than a threshold degree.

Additionally, in order to identify truly meaningful user segments, the digital analytics system focuses on larger user segments. For example, after merging overlapping rigid user segments, the digital analytics system filters smaller user segments. By so doing, the digital analytics system can avoid overwhelming marketers and analysts with too much information. In one or more embodiments, if the collection of relaxed user segments includes more than a predetermined number of user segments, the digital analytics system filters the collection such that the collection only includes the larger more meaningful user segments.

Through merging and filtering the collection of user segments, it is possible that the digital analytics system can remove relevant user data (e.g., user data for a user whose features are meaningfully similar to one or more of the remaining user segments). Accordingly, in one or more embodiments, after filtering the collection of user segments, the digital analytics system adds certain users back into the remaining collection of user segments. For example, in at least one embodiment, the digital analytics system compares removed user datasets to the centroid of each remaining user segment. If the similarity between the user dataset and the centroid of a user segment is above a threshold degree of similarity, the digital analytics system adds the user dataset back into that user segment.

Thus, by adding the additional steps of merging, filtering, and adding back in to the results of the rigid segmentation model, the digital analytics system relaxes the strong requirements of the rigid segmentation model while still reaping the benefits of the rigid segmentation model. As mentioned above, by enacting this relaxation, the digital analytics system provides many advantages and benefits over conventional analytics systems. For example, the digital analytics system accurately identifies user segments that represent meaningful and insightful user segments. Additionally, the digital analytics system is flexible and robust in identifying relevant user data outside the rigid requirements of the conventional models. Moreover, the digital analytics system efficiently utilizes system resources in only identifying user segments that have meaning and insight for an analyst.

The following terms are provided for reference. As used herein, the term "data space" refers to a collection of datasets generated by the digital analytics system. Additionally, as used herein, the term "dataset" refers to a representation of features generated by the digital analytics system and associated with a single user. In one or more embodiments, the digital analytics system associated a non-zero value (e.g., a one or "1") with features in the dataset that are possessed, enacted, or represented by the user and a zero (e.g., "0") with features in the dataset that are not possessed, enacted, or represented by the user.

As used herein, the term "feature" refers to actions, characteristics, or traits associated with users in a data space. For example, a data space may represent features across multiple users that include actions taken by a user (e.g., clicked a link, hovered over a graphic, landed on a web page), demographics represented by a user (e.g., aged 18-30, male gendered, employed), and/or a location associated with a user (e.g., southwest USA, New York City, zip code 94020). In one or more embodiments, every feature represented in a data space is binary. In other words, the digital analytics system can represent a user's association with any feature as a one (e.g., meaning the user is associated with that feature) or a zero (e.g., meaning the user is not associated with that feature). In such embodiments, originally non-binary features are transformed into binary features. For example, if a feature is age (which is not binary), the digital analytics system sets a revised feature to an age related binary feature (e.g., aged 25-40, under 25, over 60).

As used herein, the term "user" refers to a client computing device user who has interacted with a third-party network server (e.g., a web site server, a file server). For example, a user can include a client computing device user who utilizes a web browser on the client computing device to visit a web page associated with a website. Alternatively, a user is a client computing device user who utilizes a native software application, a messaging application, or other application. In one or more embodiments, the third-party network server collects data associated with the user's interactions with the web page and/or website. In at least one embodiment, the digital analytics system accesses the collected data to generate a dataset associated with the client computing device user. The digital analytics system can then add the generated dataset to a data space including user datasets associated with other users who interacted with the web page and/or website during the same time range.

As used in this disclosure, a "segment" or "segment of users" refers to a group of users whose network activities have been tracked and stored in a database. For example, a segment of users may comprise of a subgroup of users whose activities satisfy or are responsive to a segment query. In one embodiment, digital analytics system tracks and stores information related to activities of certain users (e.g., uses of a mobile application, website paths utilized by the website users, clicks per minute, time spent on a single webpage, purchases made). A segment of users can comprise a group of these users that share one or more features. A segment of user can be visitor or visit based. In other words, a segment of users can comprise a list of unique users who performed the segment defining event (i.e., visitor based). Alternatively, a segment of users can comprise a list of visits in which the segment defining event was performed (i.e., visit based), which can include multiple visits by the same user.

As used herein, the terms "bi-cluster" refers to a matrix identified within a generated data space. In at least one embodiment, a bi-cluster is a matrix within the data space that consists of a cluster of non-zero values. Thus, in at least one embodiment, a rigid users segment is group of users defined by a matrix within a user/feature data space that represents users having features in common (e.g., a bi-cluster). For example, the digital analytics system identifies bi-clusters within the data space where all the entries within each bi-cluster is non-zero, or one. The resulting collection of bi-clusters can include matrices from size 1×1 up to size R×C, where R is the number of rows (e.g., users) represented in the data space and C is the number of columns (e.g., features) represented in the data space.

Turning now to the figures, FIG. 1 illustrates a schematic diagram of one embodiment of an exemplary environment 100 in which a digital analytics system 104 can operate. As illustrated in FIG. 1, the exemplary environment 100 may include users 118a-118d, client computing devices 114a-114d, a third-party network server 112 (e.g., a web server), and a network 110 (e.g., the Internet). As further illustrated in FIG. 1, the client computing devices 114a-114d can communicate with the third-party network server 112 and the server(s) 102 through the network 110. Although FIG. 1 illustrates a particular arrangement of the users 118a-118d, the client computing devices 114a-114d, the network 110, the third-party network server 112, and the digital analytics system 104, various additional arrangements are possible. For example, the client computing devices 114a-114d may directly communicate with the third-party network server 112 (or server(s) 102), bypassing the network 110.

Figure 8:
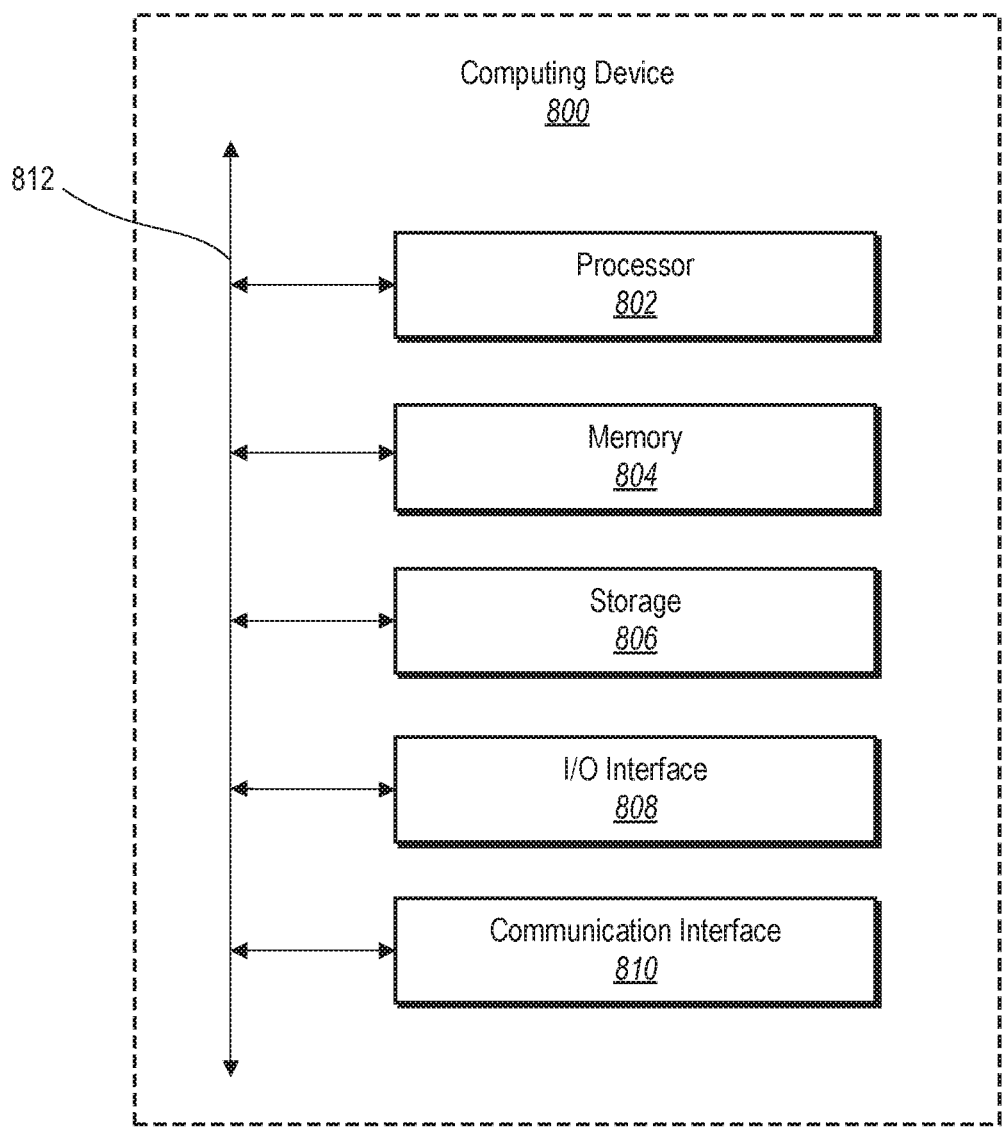
FIG. 8 illustrates a block diagram of an exemplary computing device in accordance with one or more embodiments.

Moreover, the server(s) 102 and the digital analytics system 104 may manage, query, and analyze data representative of some or all of the users 118a-118d. Additionally, the digital analytics system 104 may manage, query, and analyze data representative of other users associated with the third-party network server 112. Furthermore, in one or more embodiments, the users 118a-118d can interact with the client computing devices 114a-114d, respectively. Examples of client computing devices 114a-114d may include, but are not limited to, mobile devices (e.g., smartphones, tablets), laptops, desktops, or any other type of computing device. FIG. 8, and the associated description, provides additional information regarding computing devices, such as client computing devices.

As shown in FIG. 1, in one or more embodiments, the server(s) 102 can include an automatic segment generator 106 comprising at least a portion of the digital analytics system 104. The digital analytics system 104 can track, manage, query, and/or analyze data representative of some or all of the users 118a-118d. Furthermore, the digital analytics system 104 can include software and/or hardware tools that allow a third-party network server 112 and/or users 118a-118d of the client computing devices 114a-114d to manage and query data representative of some or all of the users 118a-118d.

The automatic segment generator 106 can comprise an application running on the server(s) 102. Alternatively, a portion of the automatic segment generator 106 can be downloaded from the server(s) 102. For example, the automatic segment generator 106 can include a web hosting application that allows the third-party network server 112 and/or the client computing devices 114a-114d to interact with data hosted at the server(s) 102.

Additionally, in one or more embodiments, the client computing devices 114a-114d of environment 100 can communicate with the third-party network server 112 through the network 110. In one or more embodiments, the network 110 may include the Internet or World Wide Web. The network 110, however, can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks.

In one or more embodiments, the client computing devices 114a-114d may communicate with the third-party network server 112 for a variety of purposes. For example, the third-party network server 112 may be a web server, a file server, a server, a program server, an application store, etc. Thus, in one or more embodiments, the client computing devices 114a-114d communicate with the third-party network server 112 for purposes such as, but not limited to, requesting a web page, uploading a file, updating a profile, downloading a game, and so forth. For example, in one embodiment the third-party network server 112 may be a web server for an ecommerce business. In that example, a user 118a-118d may communicate with the web server by requesting web pages from the web server for display via a web browser operating on the client computing device 114a-114d.

In one embodiment, the digital analytics system 104 can track and store various user data related to interactions between the client computing devices 114a-114d and the third-party network server 112. For example, the digital analytics system 104 may track user data including, but not limited to, user actions (i.e., URL requests, link clicks, mouse hovers, text inputs, video views, button clicks, etc.), time data (i.e., when a link was clicked, how long a user stayed on a webpage, when an application was closed, etc.), path tracking data (i.e., what web pages a user visits during a given session, etc.), demographic data (i.e., an indicated age of a user, an indicated gender of a user, an indicated socioeconomic status of a user, etc.), geographic data (i.e., where a user is located, etc.), and transaction data (i.e., the types of purchases a user makes, etc.), as well as other types of data. For instance, in one embodiment, the third-party network server 112 may be a web server, and the client computing devices 114a-114d may communicate with the third-party network server 112 in order to request web page information so that a certain web page may be displayed to the user 118a-118d of client computing device 114a-114d via the client computing devices 114a-114d. In that case, the digital analytics system 104 may track the user action (i.e., requesting the web page data), the time the action was performed, the geographic information associated with the client computing devices 114a-114d (i.e., a geographic area associated with an IP address assigned to the client computing devices 114a-114d), and/or any demographic data that may be associated with the users 118a-118d.

The digital analytics system 104 can track and store user data in various ways. For example, in some instances, the third-party network server 112 may track user data. In one embodiment, the third-party network server 112 can track the user data and then report the tracked user data to an analytics server, such as the server(s) 102 (i.e., via the dashed line illustrated in FIG. 1). In order to obtain the tracking data described above, the third-party network server 112 may utilize data stored on the client computing devices 114a-114d (i.e., a browser cookie), embed computer code (i.e., tracking pixels), initialize a session variable, access a user profile, or engage in any other type of tracking technique. Once the third-party network server 112 has tracked the user data, the third-party network server 112 may report the tracked user data to the server(s) 102.

Alternatively or additionally, the server(s) 102 may receive tracked user data directly from the client computing devices 114a-114d. For example, the third-party network server 112 may install software code (tracking pixels of JavaScript) in web pages or native software applications provided to the client computing devices 114a-114d that causes the client computing devices 114a-114d to report user data directly to the server(s) 102.

As illustrated in FIG. 1, the server(s) 102 may be communicatively coupled with an analytics database 108 (i.e. a central repository of data). In one or more embodiments, the analytics database 108 may store tracked user data. As shown, the analytics database 108 may be separately maintained from the server(s) 102. Alternatively, in one embodiment, the server(s) 102 and the analytics database 108 may be combined into a single device or collection of devices (e.g., as demonstrated by the dashed box 120). In at least one embodiment, the analytics database 108 may be a series of remote databases controlled by a central manager.

For example, in one or more embodiments, the analytics database 108 may utilize a distributed architecture, wherein the analytics database 108 includes multiple storage devices that are not all connected to a common processing unit, but rather are controlled by a database management system. For instance, in one or more embodiments, the multiple storage devices of the analytics database 108 are dispersed over a network. Stored data may be replicated, fragmented, or partitioned across the multiple storage devices. In at least one embodiment, in response to a data query, the database management system of the analytics database 108 may return only a random sampling of data in order to save on processing time and resources. Alternatively or additionally, in response to a data query, the database management system of the analytics database 108 may return a full data set.

Furthermore, as shown in FIG. 1, the environment 100 may include a client computing device 114a that operates an analytics application 116. In one or more embodiments, a user 118a may be a network administrator or data analyst who queries analytics data (e.g., user segment reports) from the server(s) 102 via the client computing device 114a. In one embodiment, the server(s) 102 may provide various graphical user interface controls and displays to the analytics application 116 at the client computing device 114a in order to help the user 118a perform data analysis. Additionally, the server(s) 102 may receive and process requests from the analytics application 116, and provide analysis results based on the received requests.

Figure 2:
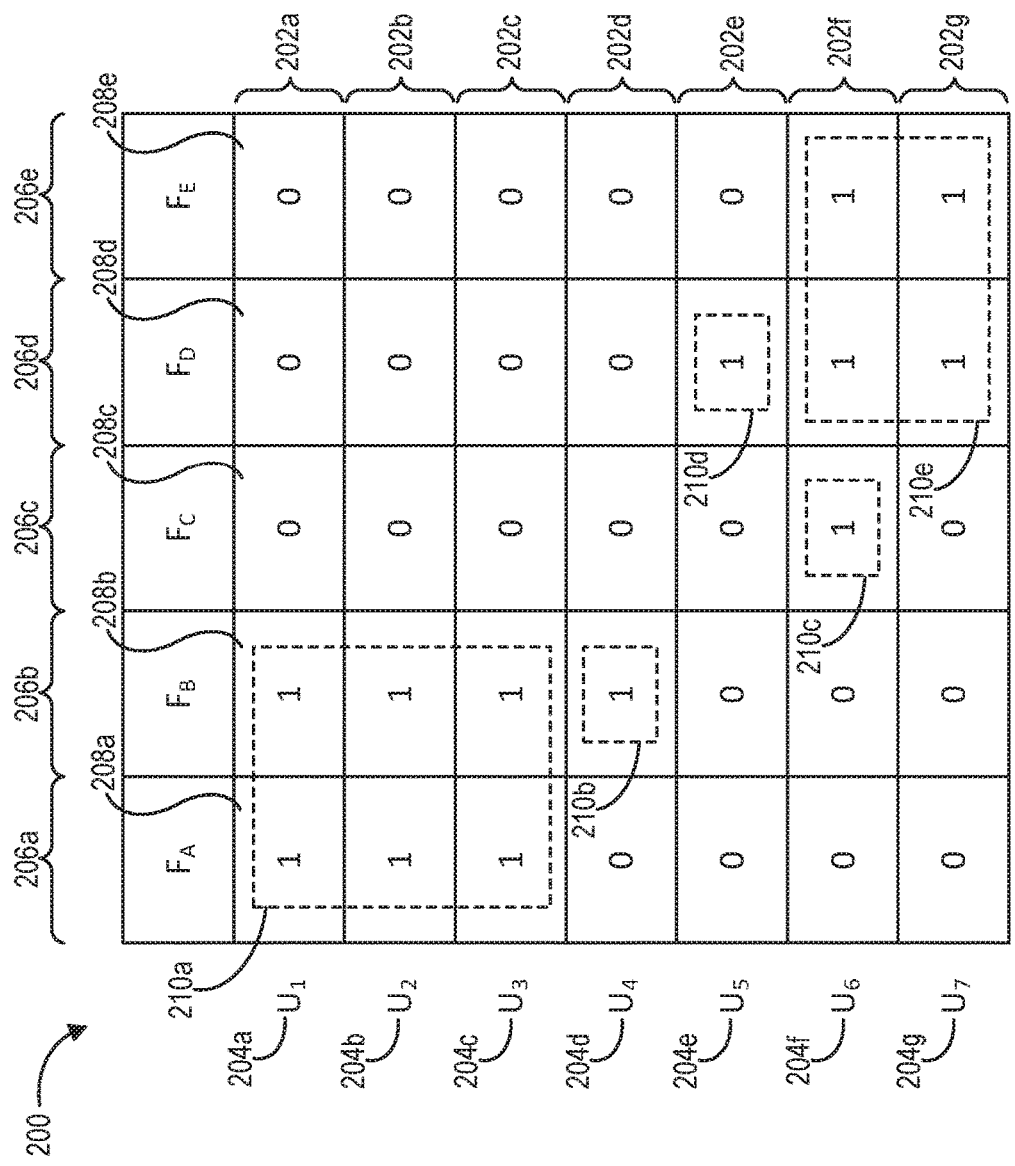
FIG. 2 illustrates an example data space utilized by the digital analytics system in accordance with one or more embodiments.

FIG. 2 illustrates an example embodiment of a data space 200. As mentioned above, in response to a request for an user segment report, the automatic segment generator 106 generates the data space 200. For example, the automatic segment generator 106 can generate the data space 200 based on parameters specified in the user segment report request including, but not limited to, a third-party network server (e.g., the third-party network server 112), and a time range (e.g., February 1-February 7). In one or more embodiments, the automatic segment generator 106 generates the data space 200 that corresponds to the request parameters by generating one or more user datasets (e.g., user datasets 202a-202g).

As shown in FIG. 2, the automatic segment generator 106 generates the user datasets 202a-202g to represent users who interacted with the specified third-party network server during the specified time range. In one or more embodiments, each user dataset 202a-202g represents data specific to a user 204a-204g across the features 206a-206e. To illustrate, the data entries 208a-208e at the intersection of the user 204a and each of the features 206a-206e indicate whether or not the user 204a corresponds to the associated feature. For example, in one embodiment, the feature 206a is "male," the feature 206b is "aged 18-30," the feature 206c is "Los Angeles," the feature 206d is "clicked videogames.html from home.html," and the feature 206d is "remained on the website for more than 5 minutes." Accordingly, the dataset 202a indicates that the user 204a is a male aged 18-30 who does not correspond with any of the other features 206c-206e.

In one or more embodiments, the automatic segment generator 106 generates a user dataset by querying data (e.g., from the third-party network server 112, from the analytics database 108) associated with a single user (e.g., with a single IP address, with a single username, with a single user account identifier). The automatic segment generator 106 then assembles this queried data into a user dataset based on the features specified for the dataset. For example, the user segment report request received by the server(s) 102 may specify features in which the user 118a of the client computing device 114a is interested. Based on these specified features, the automatic segment generator 106 determines whether the user is associated with a feature (e.g., making the corresponding entry in the dataset a non-zero, or one), or is not associated with the feature (e.g., making the corresponding entry in the dataset a zero).

As further illustrated in FIG. 2, the automatic segment generator 106 identifies the user segment bi-clusters 210a, 210b, 210c, 210d, and 210e within the data space 200. In one or more embodiments, as will be described in greater detail below, the automatic segment generator 106 utilizes the Bi-Max bi-clustering algorithm to identify the user segment bi-clusters 210a-210e. As shown in FIG. 2, each of the user segment bi-clusters 210a-210e includes a matrix of non-zero entries. In at least one embodiment, the automatic segment generator 106 identifies user segment bi-clusters of any size from a 1×1 matrix (e.g., as with the user segment bi-clusters 210b, 210c, and 210d) to a matrix the size of the data space 200. Taken at this stage, the user segment bi-clusters 210a-210e inform an analysis of features shared among groups of users. For example, the user segment bi-cluster 210a indicates that the largest feature sharing group represented within the data space 200 are users who share the features 206a and 206b.

As just mentioned, utilizing the Bi-max bi-clustering algorithm, the automatic segment generator 106 identifies all of the user segment bi-clusters 210a-210e in the data space 200 regardless of user segment bi-cluster size. The identified user segment bi-clusters 210a-210e, however, can fail to represent insightful and/or meaningful user segments. For example, the user segment bi-cluster 210a does not include the user 204d, even though the user segment bi-cluster 210b associated with the user 204d is meaningfully similar to the user segment bi-cluster 210a. Similarly, the user segment bi-cluster 210e fails to include similar user segment bi-clusters 210d and 210c. Furthermore, the user segment bi-clusters 210b, 210c, and 210d are so small that they fail to given any true insight on the represented users.

In one or more embodiments, the automatic segment generator 106 adds additional steps to the user segmentation process, as illustrated in FIG. 3A, in order to add meaning and insight to user segment reports generated based on the data space 200'. For example, FIG. 3A illustrates an overview of the relaxed segmentation process performed by the automatic segment generator 106. As shown in FIG. 3A, the relaxed bi-segmentation process begins when the automatic segment generator 106 generates the data space 200', as described above with reference to FIG. 2. Then as mentioned with regard to FIG. 2 and as discussed further below, the automatic segment generator 106 utilizes the a rigid segmentation algorithm (e.g., a Bi-Max bi-clustering algorithm) to identify the rigid user segments (also referred to herein as user segment bi-clusters) 210f-210n from within the data space 200'.

As shown in FIG. 3A, the Bi-Max bi-clustering algorithm often identifies overlapping user segment bi-clusters, such as the user segment bi-clusters 210f, 210g, and 210h. If the automatic segment generator 106 stopped the process at this point, the resulting user segment reports based on the identified user segment bi-clusters would be inefficient because of the significant amount of overlap between the user segment bi-clusters 210f, 210g, and 210h. Accordingly, the first additional step performed by the automatic segment generator 106 in the relaxed bi-clustering process beyond the Bi-Max bi-clustering model is a merge operation in connection with the identified user segment bi-clusters 210f-210n.

In one or more embodiments, the automatic segment generator 106 identifies a degree of overlapping features between identified user segment bi-clusters 210f-210n within the data space 200'. If the identified degree of overlapping features between two user segment bi-clusters is more than a threshold degree of overlapping features, the automatic segment generator 106 merges the user segment bi-clusters into a relaxed user segment. For example, as shown in FIG. 3A, the automatic segment generator 106 determines the degree of overlapping features between the user segment bi-clusters 210f, 210g, and 210h is higher than the threshold degree of overlapping features. Accordingly, the automatic segment generator 106 merges the user segment bi-clusters 210f, 210g, and 210h into a single user segment 210o. As there is no degree of overlapping features between the user segment bi-clusters 210i-210n, the automatic segment generator 106 does not perform a merge operation in connection with any of these user segment bi-clusters 210i-210n.

As mentioned above, small user segments can generally fail to yield any meaningful or insightful user segment data. Put another way, in one or more embodiments, the automatic segment generator 106 places a heavier emphasis on larger user segments. Accordingly, the next step in the relaxed bi-clustering process performed by the automatic segment generator 106 is to filter the user segment bi-clusters 210i-210o. In at least one embodiment, the automatic segment generator 106 filters the user segment bi-clusters 210i-210o such that only the largest user segment bi-clusters within a threshold number of user segment bi-clusters remain. For example, as shown in FIG. 3A, if the threshold number of user segment bi-cluster is two, the automatic segment generator 106 filters the user segment bi-clusters 210i, 210j, 210k, 210l, and 210n out of the collection of user segment bi-clusters, such that only the largest two user segment 210o and 210m remain.

In one or more embodiments, the automatic segment generator 106 may have filtered out users within the data space 200' that are very similar to one or more of the user segments 210o, 210m. In order to make the user segments 210o and 210m as meaningful and insightful as possible for the eventual user segment reports, the automatic segment generator 106 can add users back into one or more of the user segment 210o, 210m. For example, the automatic segment generator 106 can determine that a previously removed dataset associated with a user shares more than a threshold degree of similarity with the centroid of at least one of the user segments 210o, 210m. In response to this determination, the automatic segment generator 106 can add the dataset back into the at least one user segment. As shown in FIG. 3A, the resulting user segments 210o' and 210m' represent user segments with characteristics that are meaningful and insightful.

In at least one embodiment, in response to determining user segments 210o' and 210m', the automatic segment generator 106 can generate a user segment report for each user segment 210o', 210m'. For example, each user segment 210o', 210m' represents a group of users (e.g., users of the third-party network server 112) who share a relaxed collection of features. Accordingly, the automatic segment generator 106 can generate a user segment report for each user segment 210o', 210m' including the features represented by each user segment 210o', 210m', the number of users included in each user segment 210o', 210m', and any identifying information associated with the users included in each user segment 210o', 210m'.

Figure 3B:
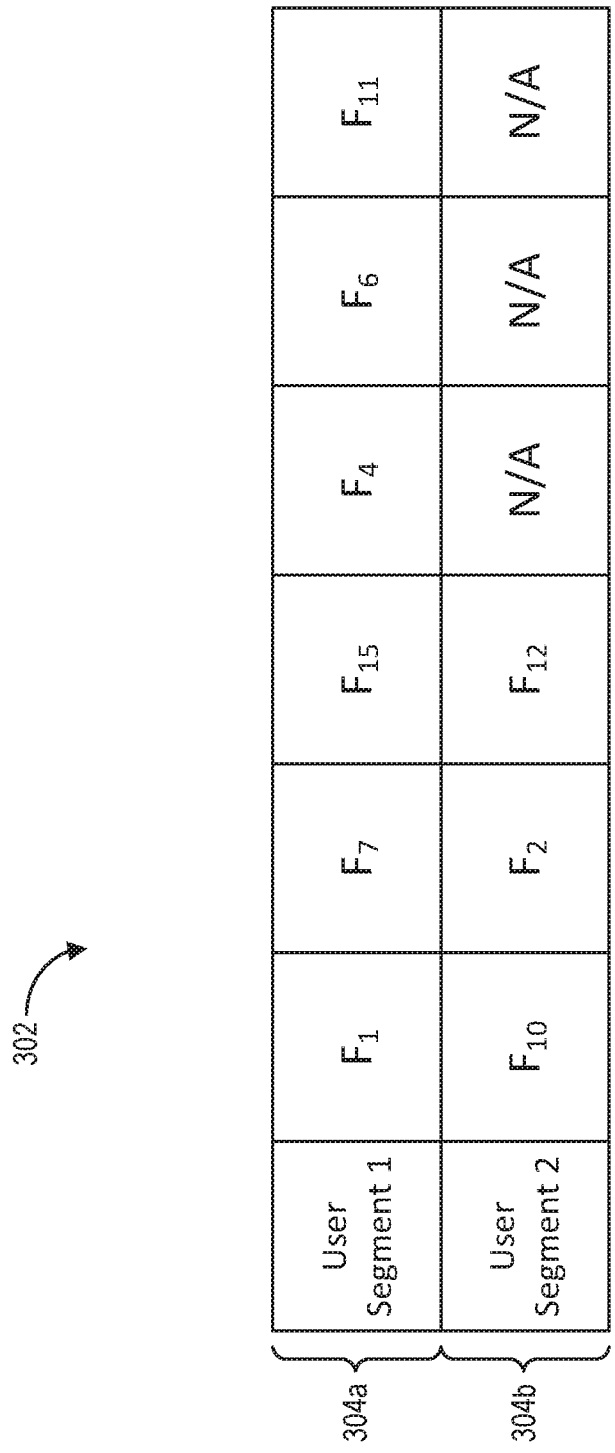
FIG. 3B illustrates an example user segment report corresponding to the generated user segments of FIG. 3A in accordance with one or more embodiments.

For example, FIG. 3B illustrates a generated user segment report 302 based on the determined user segments 210o' and 210m'. As shown in FIG. 3B, the automatic segment generator 106 generates the user segment report 302 including the features represented by each user segment 210o' and 210m'. For instance, the first row 304a of the user segment report 302 (e.g., "User Segment 1") is associated with the user segment 210o' and includes the relaxed collection of features (e.g., "$F_1$," "$F_7$," "$F_{15}$," "$F_4$," "$F_6$," "$F_{11}$,") shared by the users included in the user segment 210o'. Similarly, the second row 304b of the user segment report 302 (e.g., "User Segment 2") is associated with the user segment 210m' and includes the relaxed collection features (e.g., "$F_{10}$," "$F_2$," "$F_{12}$,") shared by the users included in the user segment 210m'. As shown in FIG. 3B, the automatic segment generator 106 determines user segments of different sizes representing different numbers of features. In alternatively embodiments, the automatic segment generator 106 can generate the user segment report 302 as a list, a chart, a graphic, or any type of illustration. Additionally, the automatic segment generator 106 can provide the generated user segment report 302 as a text file, a PDF, an SMS text message, a CSV file, a graphical user interface, or any other suitable electronic communication.

In response to receiving a generated user segment report (such as the user segment report 302 via the analytics application 116 on the client computing device 114a), the digital analytics system 104 can utilize the user segment report in various ways. For example, in at least one embodiment, the digital analytics system 104 can utilize the user segment report to provide customized communications and/ or content to the user segments defined therein. For instance, based on the features associated with the user segment 210o' in the first row 304a of the user segment report 302, the digital analytics system 104 can generate a digital advertisement including a customized offer. The digital analytics system 104 can then provide the generated digital advertisement to website visitors (e.g., via a banner advertisement, a popup window) who have features that match the features listed in the first row 304a of the user segment report 302.

The digital analytics system 104 can also utilize the generated user segment report in other ways. For example, in another embodiment, the digital analytics system 104 can generate a re-engagement email including content tailored to the users represented in the second row 304b of the user segment report 302. In that example, the digital analytics system 104 may generate the email content based on the features listed in the second row 304b such that the users who receive the email are more likely to re-engage with a website, a social networking site, a news provider, and so forth.

Figure 4:
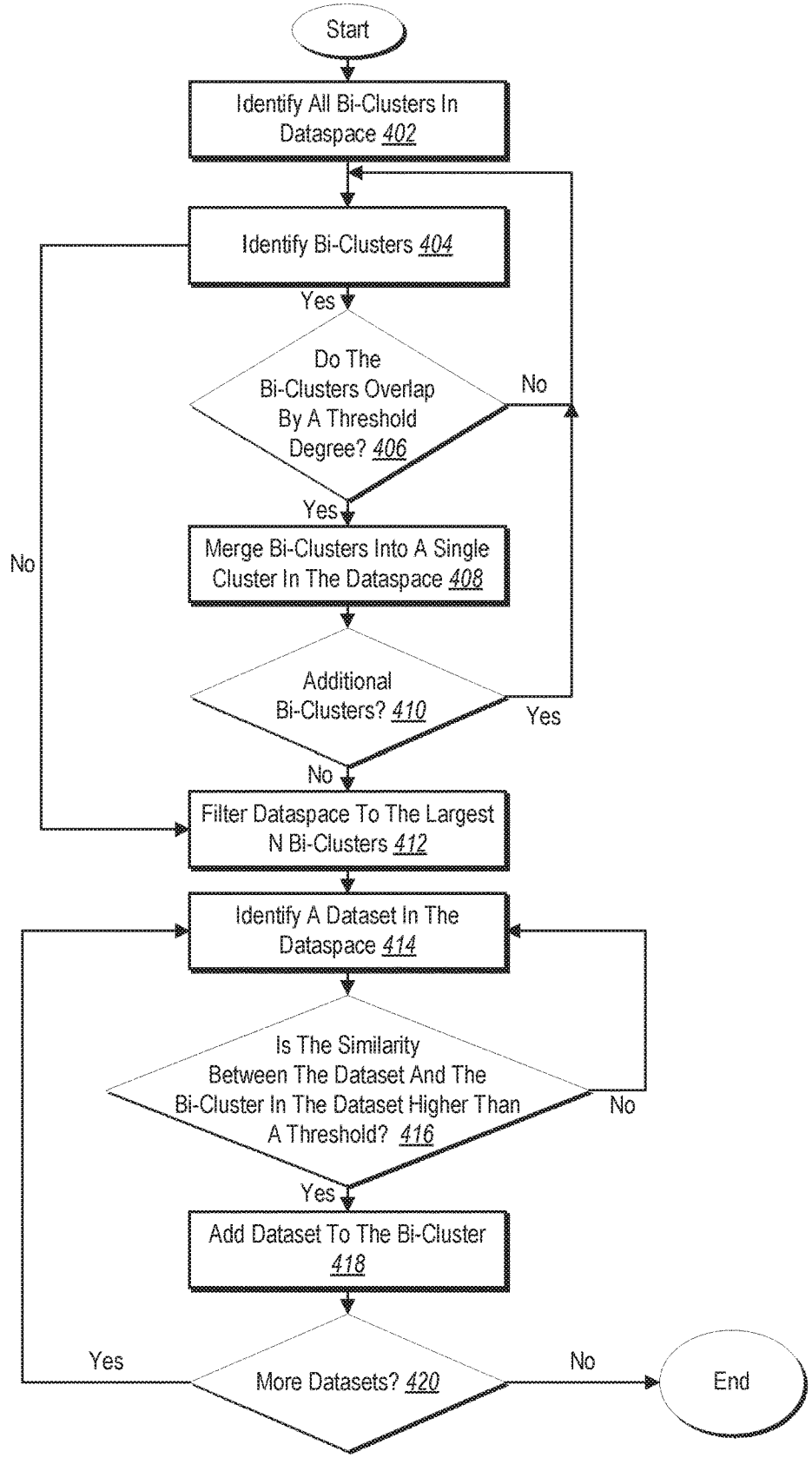
FIG. 4 illustrates a sequence diagram of steps involved in generating meaningful and insightful user segments by the digital analytics system in accordance with one or more embodiments.

FIG. 4 illustrates a series of steps performed by the automatic segment generator 106 in generating relaxed user segments described with reference to FIG. 3A. For example, as shown in FIG. 4, the series of steps starts with the automatic segment generator 106 identifying all the user segment bi-clusters in a data space (402). In one or more embodiments, the automatic segment generator 106 utilizes the Bi-Max bi-clustering model to identify user segment bi-clusters (e.g., rigid user segments) in a data space.

As mentioned above, the objective of the Bi-Max bi-clustering model is to identify all user segment bi-clusters in a data space whose entries are entirely non-zero (e.g., all entries in each identified user segment bi-cluster is 1). Put another way, the Bi-Max bi-clustering algorithm enumerates all inclusion-maximal user segment bi-clusters, which are user segment bi-clusters of all non-zeroes, to which no row or column can be added without introducing a zero. In at least one embodiment this can be written, an inclusion-maximal user segment bi-cluster of $B_{R \times C}$ is a set of rows and a set of columns (R, C), such that:

a) $\forall i \in R, \forall j \in C, B[i,j]=1$
b) for any other user segment bi-clusters (R', C') that meets condition a, $(R \in R', C \in C') \rightarrow (R=R', C=C')$ Thus, through the Bi-Max bi-clustering model, the automatic segment generator 106 utilizes a recursive "divide and conquer" strategy to enumerate all the user segment bi-clusters in the identified data space. In additional or alternative embodiments, the automatic segment generator 106 can utilize other models, methods, or algorithms to identify all clusters or bi-clusters within the data space.

After utilizing the Bi-Max bi-clustering model to identify all possible user segment bi-clusters, the automatic segment generator 106 begins merging user segment bi-clusters. For example, the automatic segment generator 106 first identifies user segment bi-clusters (404) (e.g., a unique pair of user segment bi-clusters). For instance, the automatic segment generator 106 may compare a first user segment bi-cluster against every other user segment bi-cluster within the data space until either merging the first user segment bi-cluster with another user segment bi-cluster or reaching an end of other user segment bi-clusters for comparison. As such, the automatic segment generator 106 iterates through every possible combination of pairs of user segment bi-clusters within the data space.

After identifying a unique pair of user segment bi-clusters (404), the automatic segment generator 106 determines whether the pair of user segment bi-clusters overlap by a threshold degree (406). In one or more embodiments, the automatic segment generator 106 determines the degree of overlapping features between two user segment bi-clusters by determining the intersection over the union of the two user segment bi-clusters (e.g., by applying the Jaccard Index). For instance, the automatic segment generator 106 determines the degree of overlapping features between two user segment bi-clusters as:

$$\frac{\text{size}(\text{Intersect}(bicluster1, bicluster2))}{\text{size}(\text{Union}(bicluster1, bicluster2))}$$

In at least one embodiment, the resulting degree of overlapping features is in the range of 0 to 1, with 0 indicating no overlap between the two user segment bi-clusters (e.g., the two user segment bi-clusters are completely separate within the data space), and 1 indicating total overlap between the two user segment bi-clusters (e.g., the two user segment bi-clusters are identical).

In one or more embodiments, the automatic segment generator 106 determines whether the determined degree of overlapping features between the two user segment bi-clusters is equal to or more than a threshold degree of overlapping features (e.g., a merging factor). For example, in one embodiment, the threshold degree of overlapping may be manually specified as a single degree (e.g., 0.3) or as a range of degrees (e.g., 0.15-0.4). Alternatively, the automatic segment generator 106 can utilize machine learning to specify and optimize the threshold degree of overlapping.

If the degree of overlapping features between the two user segment bi-clusters is less than the threshold degree of overlapping features (e.g., "No"), the automatic segment generator 106 identifies new user segment bi-clusters (404) for another merge cycle. If the degree of overlapping features between the two user segment bi-clusters is equal to or more than the threshold degree of overlapping features (e.g., "Yes"), the automatic segment generator 106 merges the pair of user segment bi-clusters into a single user segment bi-cluster within the data space (408). For example, the automatic segment generator 106 can merge a pair of user segment bi-clusters by creating a new user segment bi-cluster that includes all the entries in common between the overlapping pair of user segment bi-clusters. The automatic segment generator 106 can add zero entries to fill out any overhanging rows or columns in the new user segment bi-cluster such that the new user segment bi-cluster is a matrix of mostly ones.

Next, the automatic segment generator 106 determines whether there are additional user segment bi-clusters within the data space (410). For example, the automatic segment generator 106 may determine whether the first user segment bi-cluster in the pair of recently analyzed user segment bi-clusters has been compared to every other user segment bi-cluster in the data space. If not, the automatic segment generator 106 iterates to the next user segment bi-cluster and identifies the first user segment bi-cluster and the next user segment bi-cluster as the next pair of user segment bi-clusters (404). If the automatic segment generator 106 determines that the first user segment bi-cluster in the pair of recently analyzed user segment bi-clusters has been compare to every other user segment bi-cluster in the data space, the automatic segment generator 106 can select a new first user segment bi-cluster to iteratively compare against every other user segment bi-cluster with which it has not been compared.

In response to determining that there are no additional user segment bi-clusters within the data space (e.g., that all user segment bi-clusters that overlap by the threshold degree of overlapping features have been merged), the automatic segment generator 106 filters the data space to a number "N" of largest user segment bi-clusters (412). In one or more embodiments, the automatic segment generator 106 operates under an objective of finding a number of biggest user segment bi-clusters within the data space. For example, if the number of user segment bi-clusters after the merging operation is too large, it is difficult for the automatic segment generator 106 to provide meaningful user segment reports. Accordingly, in at least one embodiment and in order to provide truly meaningful and insightful analyses of high dimensional data spaces, the automatic segment generator 106 filters out user segment bi-clusters from the group that are too small. In one or more embodiments, the number of biggest user segment bi-clusters is manually specified by an analyst or manager. Alternatively, the automatic segment generator 106 can predetermine the number of biggest user segment bi-clusters on a sliding scale depending on the total number of user segment bi-clusters remaining after the merge process.

In one or more embodiments, the automatic segment generator 106 filters (412) the collection of merged user segment bi-clusters to only include a predetermined number of largest user segments. For example, of the predetermined number is five, the automatic segment generator 106 can identify five user segments from the collection of merged user segment bi-clusters. Then for every additional user segment bi-cluster in the collection of merged user segment bi-clusters, the automatic segment generator 106 can determine whether the additional user segment bi-cluster is larger than at least one of the user segments in the group of five user segment bi-clusters. If the additional user segment bi-cluster is larger than at least one of the user segments in the group of five user segment bi-clusters, the automatic segment generator 106 swaps the additional user segment bi-cluster with the user segment in the group of five user segment. If the additional user segment bi-cluster is not larger than at least one of the user segments in the group of five user segments, the automatic segment generator 106 can filter the additional user segment bi-cluster from the collection of merged user segment bi-clusters. In this manner, the automatic segment generator 106 can ensure that the largest user segments are swapped into the group of five user segments.

In some embodiments, when determining whether one user segment bi-cluster is larger than another user segment bi-cluster, the automatic segment generator 106 can give preference to breadth over width. For example, if two user segment bi-clusters include the same number of entries (e.g., 20 entries), but one user segment bi-cluster is wider than the other (e.g., one is a 5×4 user segment bi-cluster while the other is a 4×5 user segment bi-cluster), the automatic segment generator 106 can determine that the wider user segment bi-cluster is the larger user segment bi-cluster. In that embodiment, the automatic segment generator 106 is giving preference to features over user size. Alternatively, the automatic segment generator 106 can give preference to width over breadth, thus giving preference to user size over features.

After filtering the collection of merged user segment bi-clusters to the predetermined number of biggest user segment bi-clusters (412), the automatic segment generator 106 adds specific user datasets back into one or more of the user segment bi-clusters. In one or more embodiments, the merging and filtering processes described above remove users from user segments that may provide insight and meaning to an eventual user segment report. Accordingly, the automatic segment generator 106 adds user datasets back into user segment bi-clusters under certain circumstances.

In one embodiment, the automatic segment generator 106 adds an user dataset back into a user segment bi-cluster in response to determining that a similarity between a centroid of the user segment bi-cluster and the user dataset is above a predetermined degree of similarity. For example, the automatic segment generator 106 first identifies a dataset in the data space (414). In one or more embodiments, the automatic segment generator 106 identifies a dataset that is not included in any user segment bi-cluster in the group of user segment bi-clusters (e.g., a dataset that was not included in any initial user segment bi-cluster, a dataset that was filtered out of a user segment bi-cluster).

Next, the automatic segment generator 106 determines whether the similarity between the identified dataset and a user segment is higher than a predetermined threshold (418). In at least one embodiment, the automatic segment generator 106 determines this similarity based on the centroid of each user segment. For example, the automatic segment generator 106 can determine the centroid of a user segment bi-cluster utilizing one of various measures of similarity (e.g., Pearson correlation, Euclidean distance, or more generally normalized compression distance). The automatic segment generator 106 then compares the dataset not represented within any remaining user segment bi-clusters to the centroid. If the automatic segment generator 106 determines the similarity between the dataset and the centroid is above the predetermined degree of similarity, the automatic segment generator 106 adds the dataset to the user segment bi-cluster corresponding to the centroid (418).

In one or more embodiments, the automatic segment generator 106 determines whether additional datasets existing in the data space that are not included in any user segment bi-cluster (420). If there are additional datasets, the automatic segment generator 106 identifies a new dataset in the data space (414) and attempts to add the dataset back into a user segment bi-cluster. If there are no additional datasets, the automatic segment generator 106 ends the relaxed Bi-Max bi-clustering method illustrated in FIG. 4.

In one or more embodiments, the acts described above in relation to FIG. 4 comprise the corresponding structure for performing a step for relaxing the user segments from the first plurality of user segments to create a second plurality of user segments. In alternative embodiments, the algorithms described above in relation to FIG. 4 comprise the corresponding structure for performing a step for relaxing the user segments from the first plurality of user segments to create a second plurality of user segments.

Figure 5:
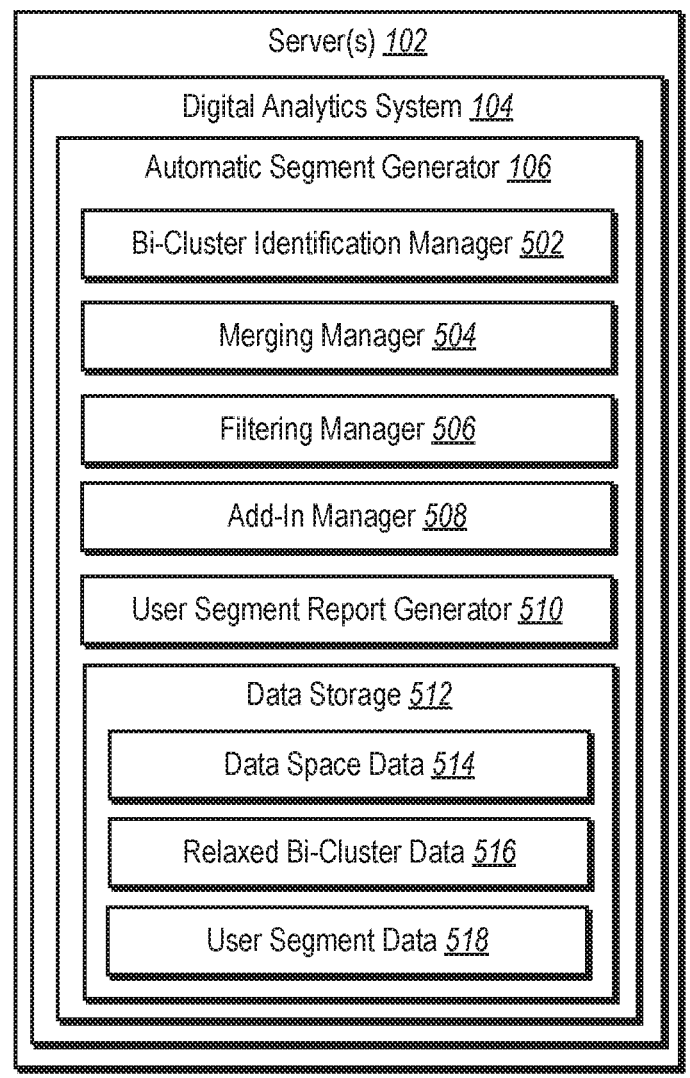
FIG. 5 illustrates a schematic diagram of the digital analytics system in accordance with one or more embodiments.

Now turning to FIG. 5, additional detail will be provided regarding components and capabilities of one example architecture of the automatic segment generator 106. As shown in FIG. 5, the automatic segment generator 106 may be implemented as part of a digital analytics system 104 on a server(s) 102. In particular, the server(s) 102 can implement the automatic segment generator 106 with a bi-cluster identification manager 502, a merging manager 504, a filtering manager 506, an add-in manager 508, a user segment report generator 510, and a data storage 512 including data space data 514, relaxed bi-cluster data 516, and user segment data 518. In additional or alternative embodiments, the elements illustrated in FIG. 5 can be implemented on a client computing device (e.g., the client computing device 114a), a third-party network server (e.g., the third-party network server 112), and/or a network (e.g., the network 110) as shown in FIG. 1.

As just mentioned, the digital analytics system 104 includes the automatic segment generator 106. In one or more embodiments, the automatic segment generator 106, and its illustrated components, handles all activities in generating user segment reports. For example, the automatic segment generator 106 receives user segment report requests from a user (e.g., the user 118a via the analytics application 116). In at least one embodiment, the automatic segment generator 106 extracts information from the request including, but not limited to, a specified third-party network server, one or more features for analysis, a specified time range for analysis, a specified maximum number of user segments, a threshold degree of overlapping features (e.g., the merging factor), a threshold degree of similarity. The automatic segment generator 106 can utilize this extracted information in generating a data space, and in conducting the other components illustrated in FIG. 5.

For example, the automatic segment generator 106 generates a high dimensional data space according to the specified third-party network server, and the one or more features for analysis. As discussed above, the automatic segment generator 106 generates a data space by first accessing tracked user data and generating one or more user datasets representing the specified features associated with individual users. The automatic segment generator 106 then assembles the generated user datasets into a high dimensional data space. In one or more embodiments, the automatic segment generator 106 extracts raw data from a third-party network server, from an analytics database, or directly from client computing devices.

As further illustrated in FIG. 5, the automatic segment generator 106 includes a bi-cluster identification manager 502. In one or more embodiments, the bi-cluster identification manager 502 identifies user segment bi-clusters within a generated data space. For example, as described above, the bi-cluster identification manager 502 can utilize the Bi-Max bi-clustering model to identify all possible user segment bi-clusters within a data space. In additional or alternative embodiments, the bi-cluster identification manager 502 can utilize other methods or techniques in identifying clusters, user segment bi-clusters, or matrices within a data space.

As mentioned above, and as illustrated in FIG. 5, the automatic segment generator 106 includes a merging manager 504. In one or more embodiments, in response to the bi-cluster identification manager 502 identifying user segment bi-clusters within a generated data space, the merging manager 504 recursively merges user segment bi-clusters that have more than a threshold degree of overlapping features. For example, as discussed above, the merging manager 504 compares every pair of user segment bi-clusters within the collection of identified user segment bi-clusters and determines a degree of overlapping features for the pair. If the determined degree is higher than a predetermined threshold degree of overlapping features, the merging manager 504 merges the pair of user segment bi-clusters into a single user segment bi-cluster. If the determined degree is lower than the predetermined threshold degree of overlapping features, the merging manager 504 disregards the pair of user segment bi-clusters. In at least one embodiment, the merging manager 504 merges two overlapping user segment bi-clusters by creating a new user segment bi-cluster including all the non-zero entries of the overlapping user segment bi-clusters with zeroes filling in any overhanging rows or columns.

As further illustrated in FIG. 5, the automatic segment generator 106 includes a filtering manager 506. In one or more embodiments, in response to the merging manager 504 creating a new collection including one or more merged user segment bi-clusters, the filtering manager 506 filters the new collection to a predetermined number of largest user segment bi-clusters. For example, as discussed above, the filtering manager 506 filters the new collection by comparing the existing user segment bi-clusters to identify the largest user segment bi-clusters within the predetermined number of user segment bi-clusters. It follows that the filtering manager 506 removes from the collection any user segment bi-clusters that are not within the predetermined number of largest user segment bi-clusters. In at least one embodiment, the filtering manager 506 utilizes a manually specified (e.g., in the user segment report request) predetermined number of largest user segment bi-clusters. Alternatively, the filtering manager 506 can automatically determine the number of largest user segment bi-clusters on sliding scale based on the number of user segment bi-clusters in the collection of merged user segment bi-clusters.

As further shown in FIG. 5, the automatic segment generator 106 includes an add-in manager 508. In one or more embodiments, the add-in manager 508 determines whether individual datasets should be added back into one or more user segment bi-clusters in the group of filtered user segment bi-clusters. In at least one embodiment, the add-in manager 508 first determines a centroid of each user segment bi-cluster in the group of filtered user segment bi-clusters. As discussed above, the add-in manager 508 determines the centroid of a user segment bi-cluster by determining a measure of similarity among all users represented by that user segment bi-cluster (e.g., utilizing Pearson correlation, Euclidean distance, or more generally normalized compression distance). The add-in manager 508 then identifies a dataset not included in any user segment bi-cluster, and determines a degree of similarity between the dataset and the centroid of each user segment bi-cluster. If the degree of similarity is higher than a threshold degree of similarity, the add-in manager 508 adds the dataset to the user segment bi-cluster.

Additionally, as shown in FIG. 5, the automatic segment generator 106 includes a user segment report generator 510. In one or more embodiments, the user segment report generator 510 analyzes at least one user segment bi-cluster remaining after the processes described above to generate a report detailing one or more features represented in the user segment bi-cluster, and one or more users represented in the user segment bi-cluster. For example, a generated user segment report can include, but is not limited to, a listing of features represented in a user segment bi-cluster, a number of users represented in the user segment bi-cluster, user identification information (e.g., user names, account identifiers) associated with users represented in the user segment bi-cluster, and a ranking of the user segment bi-cluster (e.g., in terms of size) relative to other remaining user segment bi-clusters. In at least one embodiment, the user segment report generator 510 generates a report for each user segment bi-cluster remaining after the processes described above. Alternatively, the user segment report generator 510 can generate a report for a top number of user segment bi-clusters (e.g., based on user segment bi-cluster size), for a top percentage of user segment bi-clusters, or for the most relevant user segment bi-clusters.

As illustrated in FIG. 5, the automatic segment generator 106 also includes the data storage 512. The data storage 512 maintains data for the automatic segment generator 106. The data storage 512 can maintain data of any type, size, or kind as necessary to perform the functions of the automatic segment generator 106. The data storage 512, as shown in FIG. 5, includes data space data 514. The data space data 514, in one or more embodiments, can be collected from the server(s) 102, the analytics database 108, the network 110, the third-party network server 112, and/or the client computing devices 114a-114d.

As discussed above, the data space data 514 can include a plurality of user datasets each including feature information specific to individual users. Furthermore, the data storage 512 includes relaxed bi-cluster data 516 representative of relaxed user segment bi-cluster information, such as described herein. Moreover, the data storage 512 includes user segment data 518 representative of user segment information, such as described herein.

Each of the components 502-518 of the automatic segment generator 106 and their corresponding elements (as shown in FIG. 5) may be in communication with one another using any suitable communication technologies. It will be recognized that although components 502-518 and their corresponding elements are shown to be separate in FIG. 5, any of components 502-518 and their corresponding elements may be combined into fewer components, such as into a single facility or module, divided into more components, or configured into different components as may serve a particular embodiment.

The components 502-518 and their corresponding elements can comprise software, hardware, or both. For example, the components 502-518 and their corresponding elements can comprise one or more instructions stored on a computer-readable storage medium and executable by processors of one or more computing devices. When executed by the one or more processors, the computer-executable instructions of the automatic segment generator 106 can cause a client device and/or a server device to perform the methods described herein. Alternatively, the components 502-518 and their corresponding elements can comprise hardware, such as a special purpose processing device to perform a certain function or group of functions. Additionally, the components 502-518 and their corresponding elements can comprise a combination of computer-executable instructions and hardware.

Furthermore, the components 502-518 of the automatic segment generator 106 may, for example, be implemented as one or more stand-alone applications, as one or more modules of an application, as one or more plug-ins, as one or more library functions or functions that may be called by other applications, and/or as a cloud-computing model. Thus, the components 502-518 of the automatic segment generator 106 may be implemented as a stand-alone application, such as a desktop or mobile application. Furthermore, the components 502-518 of the automatic segment generator 106 may be implemented as one or more web-based applications hosted on a remote server. Alternatively or additionally, the components 502-518 of the automatic segment generator 106 may be implemented in a suit of mobile device applications or "apps." To illustrate, the components 502-518 of the automatic segment generator 106 may be implemented in an application, including but not limited to ADOBE® TARGET®. ADOBE" and "TARGET" are either registered trademarks or trademarks of Adobe Systems Incorporated in the United States and/or other countries.

Researchers performed tests to validate improvements of the relaxed bi-clustering method performed by the automatic segment generator 106 over conventional analytics systems (e.g., the standard Bi-Max bi-clustering method). For example, an input data space can be viewed as a random matrix whose entries are Bernoulli random variables. The probability for different entries being 1 might be different. In a "true" user segment bi-cluster, this probability, $P_{signal}$, should be higher than that for non user segment bi-cluster entries, $P_{BG}$, since the entries in a user segment bi-cluster should mostly be 1. For validation purposes, an assumption is made that $P_{signal}$ and $P_{BG}$ are the same for all user segment bi-cluster and non user segment bi-cluster entries, respectively.

The illustrated validation tests utilize a test data space of 50,000 users (e.g., rows) and 100 features (e.g., columns). The test data space includes three "true" user segment bi-clusters, each of which randomly selects some rows (e.g., users) and columns (e.g., features) with replacement. The validation test then samples the value for each entry for these 50,000*100 Bernoulli distributions with the associated probability depending on whether that entry is in one of the three "true" user segment bi-clusters. Specifically, if an entry is in a user segment bi-cluster, its value v=1 with $P_{signal}$ or v=0 with 1−$P_{signal}$. If an entry is not in a user segment bi-cluster, its value v=1 with $P_{BG}$ or v=0 with 1−$P_{BG}$. The validation test utilizes this test data space in connection with the Bi-Max bi-clustering method and the relaxed bi-clustering method, described herein.

In at least one embodiment, the validation test utilizes two performance evaluation metrics. For example, the first performance evaluation metric measures the percentage of true user segment bi-clusters detected, namely "coverage." A formal definition for "coverage" is as follows:

$$coverage = \frac{size(Intersect(detected\ bicluster,\ true\ bicluster))}{size(true\ bicluster)}$$

The second performance evaluation metric measures the degree of overlapping features between detected user segment bi-clusters and the "true" user segment bi-clusters. The second performance evaluation metric is namely "efficiency" in that it penalizes the size of the detected user segment bi-clusters outside the "true" user segment bi-clusters. A formal definition for "efficiency" is as follows:

$$\text{efficiency} = \frac{\text{size(Intersect(detected } bicluster, \text{ true } bicluster))}{\text{size(Union(detected } bicluster, \text{ true } bicluster))}$$

FIG. 6A illustrates the results of the Bi-Max bi-clustering model with the test data space as input. For example, as shown, when $P_{signal}=1$, in which case all the "true" user segment bi-clusters consist of only ones, the efficiency and coverage of Bi-Max bi-clustering is 100%, being able to detect the three "true" user segment bi-clusters perfectly. However, as zero appears inside the "true" user segment bi-clusters when $P_{signal}$ moves away from exact one, both efficiency and coverage drop significantly. At $P_{signal}=0.9$, both metrics fall from 100% to below 50% and the number of detected user segment bi-clusters increases dramatically, being upper bounded by the pre-set value of 10. Thus, as expected, Bi-Max bi-clustering is perfect at identifying user segment bi-clusters of all ones, but performs poorly in identifying the relaxed user segment bi-clusters described herein.

FIGS. 6B-6E illustrate the results of the relaxed bi-clustering method with the same test data space as input. The coverage and efficiency of the relaxed bi-clustering method, in addition to $P_{signal}$ and $P_{BG}$, are also determined by two algorithmic parameters, the threshold degree of overlapping features (e.g., the merging factor or MF) and the threshold degree of similarity (T). For example, in FIGS. 6B-6E, the efficiency, coverage, and the number of detected user segment bi-clusters from the test data space using the relaxed bi-clustering method are plotted as a function of the merging factor, at different T, $P_{BG}$, and $P_{signal}$.

The relaxed bi-clustering method is robust to $P_{BG}$ in the range from 0 to 0.3. However, the relaxed bi-clustering method is also robust to $P_{signal}$ in the range from 0.6 (not shown) to 1 and performs well when the merging factor is in range from 0.1 to 0.5. When the merging factor is within this range, both efficiency and coverage is will above 80%, and in some cases even close to 100%. If the similarity threshold is around 0.7, both metrics are mostly higher than 90%. When efficiency and coverage are higher than 80% the relaxed bi-clustering method is usually able to detect the correct number of "true" user segment bi-clusters, which is three in this test data space.

Figure 6C:
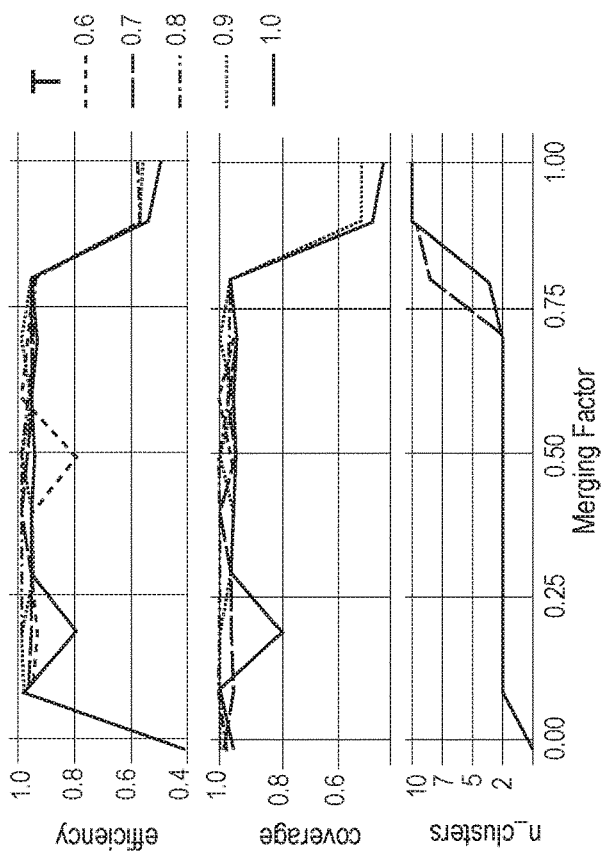
Figure 6B:
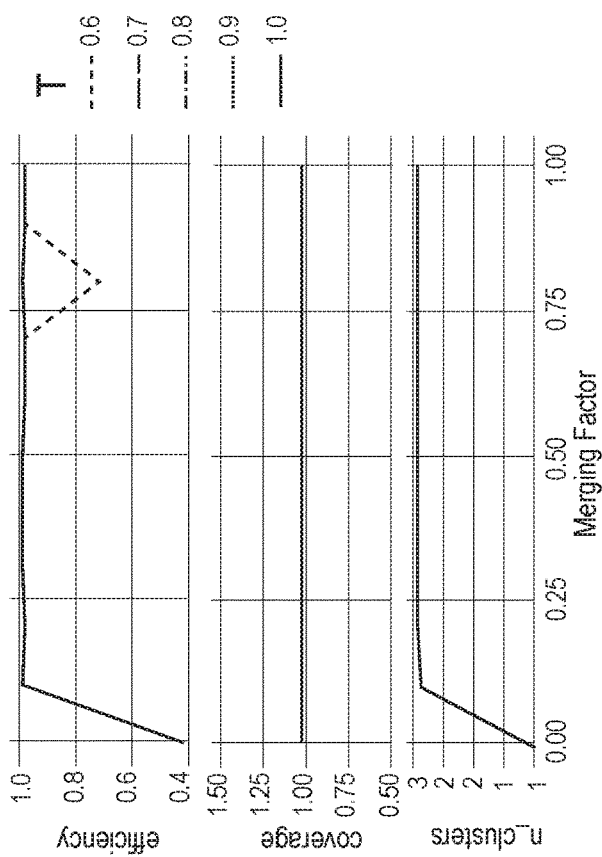
Figure 6E:
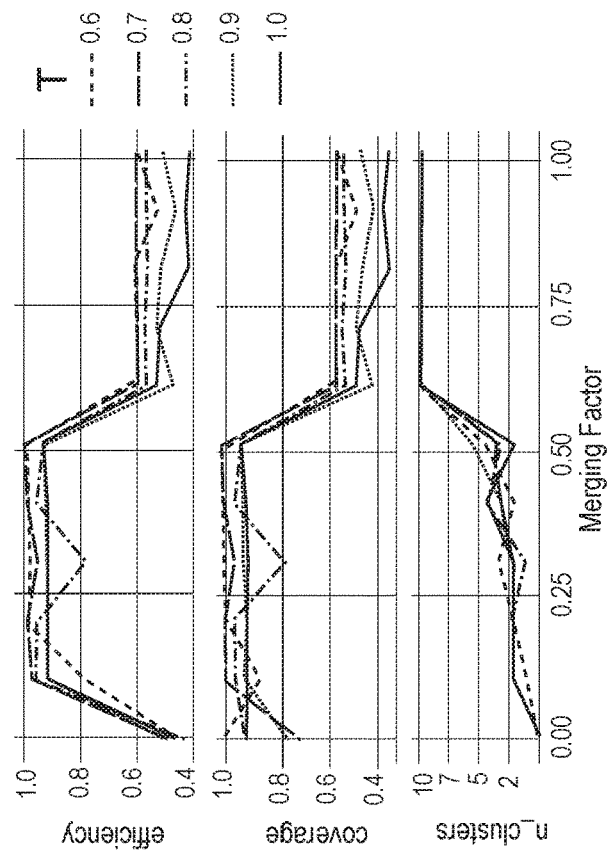
Figure 6D:
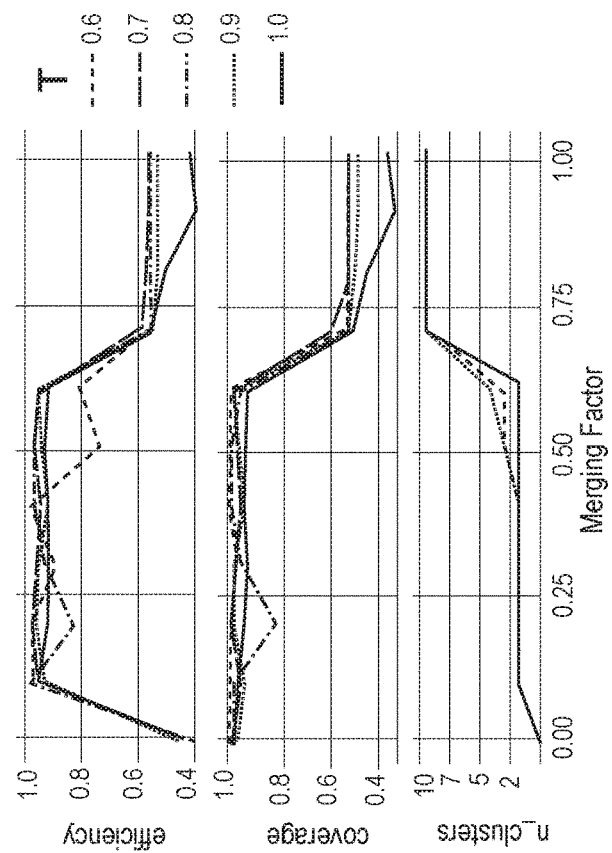

FIG. 6B illustrates efficiency, coverage, and the number of detected user segment bi-clusters in the test data space using the relaxed bi-clustering method plotted at $P_{BG}=0$ for different merging factors and similarity thresholds (T) with $P_{signal}=1$. FIG. 6C illustrates efficiency, coverage, and the number of detected user segment bi-clusters in the test data space using the relaxed bi-clustering method plotted at $P_{BG}=0$ for different merging factors and similarity thresholds (T) with $P_{signal}=0.9$. FIG. 6D illustrates efficiency, coverage, and the number of detected user segment bi-clusters in the test data space using the relaxed bi-clustering method plotted at $P_{BG}=0$ for different merging factors and similarity thresholds (T) with $P_{signal}=0.8$. FIG. 6E illustrates efficiency, coverage, and the number of detected user segment bi-clusters in the test data space using the relaxed bi-clustering method plotted at $P_{BG}=0$ for different merging factors and similarity thresholds (T) with $P_{signal}=0.7$. Test results are similar for the relaxed bi-clustering method when plotted at $P_{BG}=0.1$ and $P_{BG}=0.2$. Thus, in validity testing, the relaxed bi-clustering method is robust to a wide range of $P_{signal}$ and $P_{BG}$.

Figure 7:
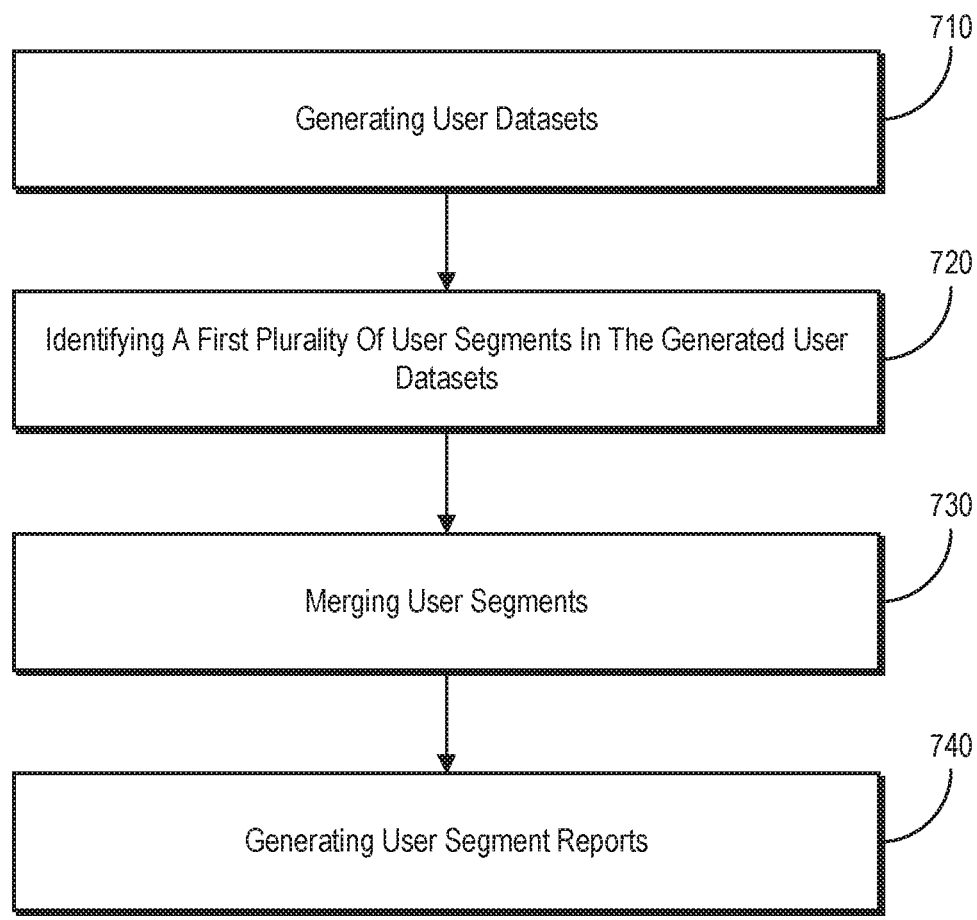
FIG. 7 illustrates a flowchart of steps in generating user segment reports in accordance with one or more embodiments.

Turning now to FIG. 7, additional detail will be provided regarding a flowchart of a series of acts 700 for generating user segment reports in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7.

As illustrated in FIG. 7, the series of acts 700 includes an act 710 of generating user datasets. In particular, the act 710 can include generating user datasets, where each user dataset represents features of a user who interacted with a third-party network server during a predetermined time range.

The series of acts 700 further includes an act 720 of identifying a first plurality of user segments in the generated user datasets. In particular, the act 720 can include using bi-clustering to identify a first plurality of user segments, wherein each user segment of the first plurality of user segments comprises users that each share one or more common features. For example, the series of acts 700 further include an act of using bi-clustering to identify the first plurality of user segments by identifying all bi-clusters in the generated user datasets, where every bi-cluster comprises a matrix of non-zero entries.

Additionally, the series of acts 700 includes an act 730 of merging user segments. In particular, the act 730 can include merging user segments from the first plurality of user segments with more than a threshold degree of overlapping features to create a second plurality of user segments. For example, merging user segments from the first plurality of user segments can include: for each pair of identified bi-clusters, determining a degree of overlapping between the pair of bi-clusters. If the degree of overlapping features between the pair of bi-clusters is more than the threshold degree of overlapping features, the act 730 can include merging the pair of bi-clusters into a single bi-cluster. In one or more embodiments, determining a degree of overlapping features between the pair of bi-clusters includes dividing a size of an intersection of the pair of bi-clusters by a size of a union of the pair of bi-clusters.

In one or more embodiments, the series of acts 700 includes an act of filtering, prior to generating user segment reports, the second plurality of user segments to a predetermined number of user segments, where the predetermined number of user segments comprises the largest user segments in the second plurality of user segments. Additionally, the series of acts 700 can include an act of, in response to filtering the second plurality of user segments, adding, to at least one user segment in the filtered second plurality of user segments, at least one user filtered out of the second plurality of user segments, wherein features associated with the at least one user indicate a threshold level of similarity with the at least one user segment in the filtered second plurality of user segments. Moreover, the series of acts 700 can further include an act of adding, to at least one user segment in the filtered second plurality of user segments, at least one user filtered out of the second plurality of user segments by: for every generated user dataset and every user segment in the filtered second plurality of user segments: determining a degree of similarity between the user dataset and a centroid of the user segment; and if the degree of similarity is higher than a threshold degree of similarity, adding the user dataset to the user segment.

Furthermore, the series of acts 700 includes an act 740 of generating user segment reports. In particular, the act 740 can include, for a top number of user segments in the second plurality of user segments: generating an user segment report indicating the shared features of users represented by the user segment of the top number of user segments of the second plurality of user segments. In one or more embodiments, generating a user segment report indicating the shared features of users represented by the user segment of the top number of user segments of the second plurality of user segments includes: identifying all features represented by the user segment; generating a display of the identified features; and providing the generated display to an analytics application on a client computing device. In at least one embodiment, the series of acts 700 includes acts of generating customized content based on the shared features indicated in the user segment report, and providing the customized content to the user represented by the user segment in the user segment report.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 8 illustrates a block diagram of an exemplary computing device 800 that may be configured to perform one or more of the processes described above. One will appreciate that one or more computing devices, such as the computing device 800 may represent the computing devices described above (e.g., the server(s) 102, the client computing devices 114a-114d, the third-party network server 112). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output ("I/O") interfaces 808, and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

We claim:

1. A computer-implemented method comprising a hardware processor to perform:
   generating a matrix of user datasets for users that interact with a third-party network server during a predetermined time range, where each user dataset represents features of a user that interacted with a third-party network server during a predetermined time range and each user dataset is represented as zero entries and non-zero entries within the matrix of user datasets;
   in response to generating the matrix of user datasets, using bi-clustering to identify a first plurality of user segments within the user datasets by:
      identifying a plurality of sub-matrices in the matrix of user datasets, wherein each sub-matrix comprises non-zero entries and is smaller than the matrix of user datasets,
      determining one or more datasets that correspond to the identified plurality of sub-matrices, and
      generating the first plurality of user segments comprising the determined one or more datasets, wherein each user segment of the first plurality of user segments comprises users that each share one or more common features;
   merging the user segments from the first plurality of user segments with more than a threshold degree of overlapping features to create a second plurality of user segments; and
   for a top number of user segments in the second plurality of user segments: generating a user segment report indicating the shared features of users represented by the user segment of the top number of user segments of the second plurality of user segments.

2. The method as recited in claim 1, further comprising filtering, prior to generating the user segment report, the second plurality of user segments to a predetermined number of user segments, where the predetermined number of user segments comprises the largest user segments in the second plurality of user segments.

3. The method as recited in claim 2, further comprising, in response to filtering the second plurality of user segments, adding, to at least one user segment in the filtered second plurality of user segments, at least one user filtered out of the second plurality of user segments, wherein features associated with the at least one user indicate a threshold level of similarity with the at least one user segment in the filtered second plurality of user segments.

4. The method as recited in claim 3, wherein adding, to at least one user segment in the filtered second plurality of user segments, at least one user filtered out of the second plurality of user segments comprises:
   for every generated user dataset and every user segment in the filtered second plurality of user segments:
      determining a degree of similarity between the user dataset and a centroid of the user segment; and
      based on the degree of similarity being higher than a threshold degree of similarity, adding the user dataset to the user segment.

5. A non-transitory computer-readable storage medium having stored thereon computer-executable instructions for automatically generating segments of users, wherein the computer-executable instructions, when executed by a processor, cause a computing device to:
   generate a matrix of user datasets for users that interact with a third-party network server during a predetermined time range, where each user dataset represents features of a user that interacted with the third-party network server during the predetermined time range and each user dataset is represented as zero entries and non-zero entries within the matrix of user datasets;
   in response to generating the user datasets, use bi-clustering to identify a first plurality of user segments within the user datasets by:
      identifying a plurality of sub-matrices in the matrix of user datasets, wherein each sub-matrix comprises non-zero entries and is smaller than the matrix of user datasets,
      determining one or more datasets that correspond to the identified plurality of sub-matrices, and
      generating the first plurality of user segments comprising the determined one or more datasets, wherein each user segment of the first plurality of user segments comprises users that each share one or more common features;
   merge user segments from the first plurality of user segments with more than a threshold degree of overlapping features to create a second plurality of user segments; and
   for a top number of user segments in the second plurality of user segments: generate a user segment report indicating the shared features of users represented by the user segment of the top number of user segments of the second plurality of user segments.

6. The non-transitory computer-readable storage medium as recited in claim 5, wherein identifying the plurality of sub-matrices in the matrix of user datasets comprises identifying every sub-matrix in the matrix of user datasets where every entry in the sub-matrix is 1.

7. The non-transitory computer-readable storage medium as recited in claim 6, further storing computer-executable instructions that, when executed by the processor, cause the computing device to merge the user segments from the first plurality of user segments by:
   for each pair of identified sub-matrices:
      determining a degree of overlapping between the pair of sub-matrices; and
      based on the degree of overlapping features between the pair of sub-matrices being more than the threshold degree of overlapping features, merging the pair of sub-matrices into a single sub-matrix.

8. The non-transitory computer-readable storage medium as recited in claim 7, wherein determining a degree of overlapping features between the pair of sub-matrices comprises dividing a size of an intersection of the pair of sub-matrices by a size of a union of the pair of sub-matrices.

9. The non-transitory computer-readable storage medium as recited in claim 5, further storing computer-executable instructions that, when executed by the processor, cause the computing device to filter, prior to generating user segment reports, the second plurality of user segments to a predetermined number of user segments, where the predetermined number of user segments comprises the largest user segments in the second plurality of user segments.

10. The non-transitory computer-readable storage medium as recited in claim 9, further storing computer-executable instructions that, when executed by the processor, cause the computing device to, in response to filtering the second plurality of user segments, add, to at least one user segment in the filtered second plurality of user segments, at least one user filtered out of the second plurality of user segments, wherein features associated with the at least one user indicate a threshold level of similarity with the at least one user segment in the filtered second plurality of user segments.

11. The non-transitory computer-readable storage medium as recited in claim 10, further storing computer-executable instructions that, when executed by the processor, cause the computing device to add, to at least one user segment in the filtered second plurality of user segments, at least one user filtered out of the second plurality of user segments by:
for every generated user dataset and every user segment in the filtered second plurality of user segments:
determining a degree of similarity between the user dataset and a centroid of the user segment; and
based on the degree of similarity being higher than a threshold degree of similarity, adding the user dataset to the user segment.

12. The non-transitory computer-readable storage medium as recited in claim 5, further storing computer-executable instructions that, when executed by the processor, cause the computing device to generate a user segment report indicating the shared features of users represented by the user segment of the top number of user segments of the second plurality of user segments by:
identifying all features represented by the user segment;
generating a display of the identified features; and
providing the generated display to an analytics application on a client computing device.

13. A system comprising:
at least one processor; and
at least one non-transitory computer-readable storage medium storing instructions thereon that, when executed by the at least one processor, cause the system to:
generate user datasets for users that interact with a third-party network server during a predetermined time range, where each user dataset represents features of a user that interacted with the third-party network server during the predetermined time range;
in response to generating the user datasets, identify, within the user datasets and using bi-clustering, a first plurality of user segments by identifying all bi-clusters in the generated user datasets, where every bi-cluster comprises a matrix of non-zero entries, and wherein each user segment of the first plurality of user segments comprises users that each share one or more common features;
merge user segments from the first plurality of user segments with more than a threshold degree of overlapping features to create a second plurality of user segments; and
for a top number of user segments in the second plurality of user segments: generate a user segment report indicating the shared features of users represented by the user segment of the top number of user segments of the second plurality of user segments.

14. The system as recited in claim 13, further storing instructions thereon that, when executed by the at least one processor, cause the system to:
generate customized content based on the shared features indicated in the user segment report; and
provide the customized content to the users represented by the top number of user segments in the user segment report.

15. The system as recited in claim 14, further storing instructions thereon that, when executed by the at least one processor, cause the system to merge user segments from the first plurality of user segments by:
for each pair of identified bi-clusters:
determining a degree of overlapping between the pair of bi-clusters; and
based on the degree of overlapping features between the pair of bi-clusters being more than the threshold degree of overlapping features, merging the pair of bi-clusters into a single bi-cluster.

16. The system as recited in claim 15, wherein determining a degree of overlapping features between the pair of bi-clusters comprises dividing a size of an intersection of the pair of bi-clusters by a size of a union of the pair of bi-clusters.

17. The system as recited in claim 16, further storing instructions thereon that, when executed by the at least one processor, cause the system to filter, prior to generating user segment reports, the second plurality of user segments to a predetermined number of user segments, where the predetermined number of user segments comprises the largest user segments in the second plurality of user segments.

18. The system as recited in claim 17, further storing instructions thereon that, when executed by the at least one processor, cause the system to, in response to filtering the second plurality of user segments, add, to at least one user segment in the filtered second plurality of user segments, at least one user filtered out of the second plurality of user segments, wherein features associated with the at least one user indicate a threshold level of similarity with the at least one user segment in the filtered second plurality of user segments.

19. The system as recited in claim 18, further storing instructions thereon that, when executed by the at least one processor, cause the system to add, to at least one user segment in the filtered second plurality of user segments, at least one user filtered out of the second plurality of user segments by:
for every generated user dataset and every user segment in the filtered second plurality of user segments:
determining a degree of similarity between the user dataset and a centroid of the user segment; and
based on the degree of similarity being higher than a threshold degree of similarity, adding the user dataset to the user segment.

20. The system as recited in claim 19, further storing instructions thereon that, when executed by the at least one processor, cause the system to generate a user segment report indicating the shared features of users represented by the user segment of the top number of user segments of the second plurality of user segments by:
identifying all features represented by the user segment;
generating a display of the identified features; and
providing the generated display to an analytics application on a client computing device.

* * * * *